(12) United States Patent
Watano et al.

(10) Patent No.: US 12,050,335 B2
(45) Date of Patent: Jul. 30, 2024

(54) METHOD OF MANUFACTURING OPTICAL ELEMENT AND OPTICAL ELEMENT

(71) Applicant: FUJIFILM Corporation, Tokyo (JP)

(72) Inventors: Akiko Watano, Minamiashigara (JP); Katsumi Sasata, Minamiashigara (JP); Yukito Saitoh, Minamiashigara (JP); Hiroshi Sato, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 177 days.

(21) Appl. No.: 17/849,302

(22) Filed: Jun. 24, 2022

(65) Prior Publication Data

US 2022/0326430 A1  Oct. 13, 2022

Related U.S. Application Data

(63) Continuation of application No. PCT/JP2020/047143, filed on Dec. 17, 2020.

(30) Foreign Application Priority Data

Dec. 27, 2019 (JP) .................. 2019-238604

(51) Int. Cl.
*F21V 8/00* (2006.01)
*G02F 1/13* (2006.01)
(Continued)

(52) U.S. Cl.
CPC ......... *G02B 6/0065* (2013.01); *G02B 6/0016* (2013.01); *G02B 6/0035* (2013.01);
(Continued)

(58) Field of Classification Search
CPC .. G02B 6/0065; G02B 6/0016; G02B 6/0035; G02B 6/0056; G02B 2027/0112;
(Continued)

(56) References Cited

U.S. PATENT DOCUMENTS

2007/0098923 A1* 5/2007 Choi ................... G02B 5/3016
428/1.31
2020/0271839 A1 8/2020 Saitoh et al.
(Continued)

FOREIGN PATENT DOCUMENTS

JP 2017-223986 A 12/2017
WO WO2019/093228 A1 5/2019
(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2020/047143, dated Jul. 7, 2022, with an English translation.

(Continued)

*Primary Examiner* — Donald L Raleigh
(74) *Attorney, Agent, or Firm* — Birch, Stewart, Kolasch & Birch, LLP

(57) ABSTRACT

Provided are: a method of manufacturing an optical element that can display a clear image; and an optical element, and the manufacturing method includes: a step of forming a photo-alignment film and a first liquid crystal layer; a step of forming a photo-alignment film and a liquid crystal layer for lamination, peeling off the liquid crystal layer for lamination, and laminating the peeled liquid crystal layer for lamination on the first liquid crystal layer or the liquid crystal layer for lamination; a step of peeling off the first liquid crystal layer; a step of forming an adhesive layer having a surface roughness Ra of 15 nm or less on the light (Continued)

guide plate and/or the first liquid crystal layer; and a step of bonding the light guide plate and the first liquid crystal layer using the adhesive layer.

20 Claims, 8 Drawing Sheets

(51) Int. Cl.
  *G02F 1/1333* (2006.01)
  *G02B 27/01* (2006.01)
(52) U.S. Cl.
  CPC ......... *G02B 6/0056* (2013.01); *G02F 1/1303* (2013.01); *G02F 1/1326* (2013.01); *G02F 1/133351* (2013.01); *G02B 2027/0112* (2013.01)
(58) Field of Classification Search
  CPC ........ G02B 27/0172; G02B 2027/0174; G02B 5/1857; G02B 5/1861; G02B 5/3016; G02B 5/18; G02B 5/30; G02F 1/1303; G02F 1/1326; G02F 1/133351; H04N 5/64; H04N 13/344
  See application file for complete search history.

(56) References Cited

U.S. PATENT DOCUMENTS

| | | |
|---|---|---|
| 2020/0326579 A1 | 10/2020 | Sato et al. |
| 2020/0348545 A1 | 11/2020 | Sato et al. |
| 2021/0026062 A1 | 1/2021 | Sato et al. |

FOREIGN PATENT DOCUMENTS

| | | |
|---|---|---|
| WO | WO2019/131918 A1 | 7/2019 |
| WO | WO2019/131966 A1 | 7/2019 |
| WO | WO2019/189809 A1 | 10/2019 |

OTHER PUBLICATIONS

International Search Report (Form PCT/ISA/210) for International Application No. PCT/JP2020/047143, dated Mar. 9, 2021, with an English translation.

Kress et al., "Towards the Ultimate Mixed Reality Experience: Hololens Display Architecture Choices," SID 2017 DIGEST, 2017, pp. 127-131.

* cited by examiner

METHOD OF MANUFACTURING OPTICAL ELEMENT AND OPTICAL ELEMENT

CROSS-REFERENCE TO RELATED APPLICATIONS

This application is a Continuation of PCT International Application No. PCT/JP2020/047143 filed on Dec. 17, 2020, which claims priority under 35 U.S.C. § 119(a) to Japanese Patent Application No. 2019-238604 filed on Dec. 27, 2019. Each of the above applications is hereby expressly incorporated by reference, in its entirety, into the present application.

BACKGROUND OF THE INVENTION

1. Field of the Invention

The present invention relates to a method of manufacturing an optical element and the optical element.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that the virtual image is displayed to be superimposed on a scene that a user is actually seeing.

In AR glasses, light (projection light) projected from a display is diffracted (refracted) using a diffraction element to be incident into one end part of a light guide plate. As a result, the light is introduced into the light guide plate at an angle such that the light propagates in the light guide plate. The light propagated in the light guide plate is also diffracted by the diffraction element in the other end part of the light guide plate and is emitted from the light guide plate to an observation position by the user.

For example, JP2017-223986A discloses AR glasses (HMD) in which an image is emitted from a display (image forming apparatus), is diffracted by a diffraction element to be incident into one light guide plate, propagates in the light guide plate, and is emitted by the diffraction element from the light guide plate to an observation position by a user to display the image.

Specifically, JP2017-223986A describes a display device including: a frame that is mounted on the head of a user; and an image display apparatus that is attached to the frame. The image display apparatus includes: an image forming apparatus; and an optical device where light emitted from the image forming apparatus is incident and emitted. The optical device includes: a light guide plate; a first deflection unit that deflects light incident into the light guide plate such that the light incident into the light guide plate is totally reflected in the light guide plate; and a second deflection unit that deflects the light propagating in the light guide plate by total reflection such that a part of the light propagating in the light guide plate by total reflection is emitted from the light guide plate, in which the first deflection unit is formed of first and second hologram diffraction gratings, the first hologram diffraction grating has a first interference fringe formation region where a first interference fringe is formed, and the second hologram diffraction grating has a second interference fringe formation region where a second interference fringe is formed.

SUMMARY OF THE INVENTION

In AR glasses where a diffraction element is mounted on the light guide plate, bonding using an adhesive such as a pressure sensitive adhesive is considered as a method of bonding the diffraction element to the light guide plate.

Incidentally, according to an investigation by the present inventors, it was found that a display image may be blurred in many cases in the AR glasses or the like in which the diffraction element is bonded to the light guide plate using an adhesive.

An object of the present invention is to solve the above-described problem of the related art and to provide: a method of manufacturing an optical element that can display a clear image without blurriness or the like in the image during the use of AR glasses or the like; and an optical element that is manufactured using this manufacturing method.

In order to achieve the object, a method of manufacturing an optical element according to an aspect of the present invention has the following configurations.

[1] A method of manufacturing an optical element comprising:
a first liquid crystal layer forming step including
a step of forming a first photo-alignment film including a photo-alignment material on a first support,
a step of performing first exposure by performing interference exposure on a surface of the first photo-alignment film to form, on the first photo-alignment film, an alignment pattern in which a direction of an optical axis derived from a liquid crystal compound changes while continuously rotating in at least one in-plane direction, and
a step of forming a first liquid crystal layer by applying a liquid crystal composition including a liquid crystal compound to the first photo-alignment film on which the alignment pattern is formed;
a liquid crystal layer lamination step that is optionally performed once or more, the liquid crystal layer lamination step including
a step of forming a photo-alignment film for lamination including a photo-alignment material on a support for lamination,
a step of performing exposure for lamination by performing interference exposure on a surface of the photo-alignment film for lamination to form, on the photo-alignment film for lamination, an alignment pattern in which a direction of an optical axis derived from a liquid crystal compound changes while continuously rotating in at least one in-plane direction,
a step of forming a liquid crystal layer for lamination by applying a liquid crystal composition including a liquid crystal compound to the photo-alignment film for lamination on which the alignment pattern is formed,
a step of peeling off the liquid crystal layer for lamination from the photo-alignment film for lamination, and a step of laminating the peeled liquid crystal layer for lamination on the first liquid crystal layer or the liquid crystal layer for lamination that is separately formed;

a first liquid crystal layer peeling step of peeling off the first liquid crystal layer from the first photo-alignment film;

an adhesive layer forming step of forming an adhesive layer having a surface roughness Ra of 15 nm or less on a surface of at least one of a light guide plate or the first liquid crystal layer; and a light guide plate bonding step of bonding the light guide plate and the first liquid crystal layer to each other through the adhesive layer.

[2] The method of manufacturing an optical element according to [1], in which in the liquid crystal layer lamination step, in the step of laminating the peeled liquid crystal layer for lamination on the first liquid crystal layer or the liquid crystal layer for lamination that is separately formed, an adhesive layer for lamination having a surface roughness Ra of 15 nm or less is formed on at least one of the first liquid crystal layer or the liquid crystal layer for lamination or an adhesive layer for lamination having a surface roughness Ra of 15 nm or less is formed on at least one of liquid crystal layers for lamination that are laminated.

[3] The method of manufacturing an optical element according to [1], in which in the liquid crystal layer lamination step, in the step of laminating the peeled liquid crystal layer for lamination on the first liquid crystal layer or the liquid crystal layer for lamination that is separately formed, after allowing at least one of the first liquid crystal layer or the liquid crystal layer for lamination to enter a semi-cured state or making at least one of liquid crystal layers for lamination that are laminated to enter a semi-cured state and laminating the peeled liquid crystal layer for lamination on the first liquid crystal layer or the liquid crystal layer for lamination, the liquid crystal layer in the semi-cured state is finally cured.

[4] The method of manufacturing an optical element according to any one of [1] to [3], in which in the first liquid crystal layer peeled off in the first liquid crystal layer peeling step, a surface roughness Ra of a surface on the first photo-alignment film side is 15 nm or less.

[5] The method of manufacturing an optical element according to any one of [1] to [4], in which in the liquid crystal layer for lamination peeled off in the step of peeling off the liquid crystal layer for lamination in the liquid crystal layer lamination step, a surface roughness Ra of a surface on the photo-alignment film for lamination side is 15 nm or less.

[6] The method of manufacturing an optical element according to any one of [1] to [5], in which in the first liquid crystal layer peeling step, after bonding a first temporary support including a pressure-sensitive adhesive layer to the first liquid crystal layer, the first liquid crystal layer is peeled off from the first photo-alignment film.

[7] The method of manufacturing an optical element according to [6], in which a surface roughness Ra of the pressure-sensitive adhesive layer of the first temporary support is 20 nm or less.

[8] The method of manufacturing an optical element according to any one of [1] to [7], in which in the step of peeling off the liquid crystal layer for lamination in the liquid crystal layer lamination step, after bonding a temporary support for lamination including a pressure-sensitive adhesive layer to the liquid crystal layer for lamination, the liquid crystal layer for lamination is peeled off.

[9] The method of manufacturing an optical element according to [8], in which a surface roughness Ra of the pressure-sensitive adhesive layer of the temporary support for lamination is 20 nm or less.

[10] An optical element comprising:

a light guide plate;

one liquid crystal layer or a plurality of liquid crystal layers that are laminated and have a liquid crystal alignment pattern in which a direction of an optical axis derived from the liquid crystal compound changes while continuously rotating in at least one in-plane direction; and an adhesive layer that bonds the liquid crystal layer and the light guide plate to each other, in which in a case where measurement light is incident from the light guide plate side and the measurement light and the light guide plate are moved relative to each other while receiving diffracted light that is diffracted by the liquid crystal layer, an intensity variation of the diffracted light is within ±40%.

According to an aspect of the present invention, a method of manufacturing an optical element that can display a clear image having no blurriness in AR glasses or the like can be provided.

DESCRIPTION OF THE PREFERRED EMBODIMENTS

Figure 1:
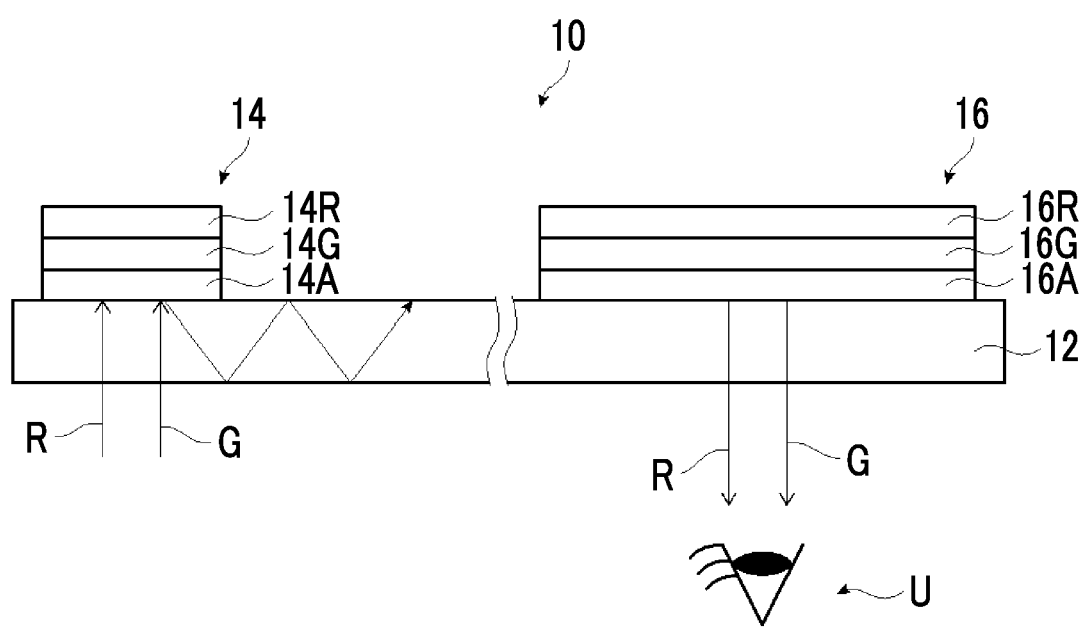
FIG. 1 is a diagram conceptually showing an example of an optical element according to the present invention.

Hereinafter, a method of manufacturing an optical element and an optical element according to an embodiment of the present invention will be described in detail based on a preferable example shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more.

A method of manufacturing an optical element according to an embodiment of the present invention includes: a first liquid crystal layer forming step of forming a first liquid crystal layer on a first photo-alignment film; a liquid crystal layer lamination step of forming one or more liquid crystal layers for lamination on the first liquid crystal layer, the liquid crystal layer lamination step being optionally performed once or more; a first liquid crystal layer peeling step of peeling off the first liquid crystal layer from the first photo-alignment film; an adhesive layer forming step of forming an adhesive layer having a surface roughness Ra of 15 nm or less on a surface of at least one of a light guide plate or the first liquid crystal layer; and a light guide plate bonding step of bonding the light guide plate and the first liquid crystal layer to each other through the adhesive layer.

In the method of manufacturing an optical element according to the embodiment of the present invention, the first liquid crystal layer forming step includes: a step of forming the first photo-alignment film on a first support; a step of performing first exposure by performing interference exposure on the first photo-alignment film to form an alignment pattern in which a direction of an optical axis derived from a liquid crystal compound changes while continuously rotating in at least one in-plane direction; and a step of forming a first liquid crystal layer by applying a liquid crystal composition including a liquid crystal compound to the first photo-alignment film on which the alignment pattern is formed.

In addition, the liquid crystal layer lamination step includes: a step of forming a photo-alignment film for lamination including a photo-alignment material on a support for lamination; a step of performing exposure for lamination by performing interference exposure on the photo-alignment film for lamination to form, on the photo-alignment film for lamination, an alignment pattern in which a direction of an optical axis derived from a liquid crystal compound changes while continuously rotating in at least one in-plane direction; a step of forming a liquid crystal layer for lamination by applying a liquid crystal composition including a liquid crystal compound to the photo-alignment film for lamination on which the alignment pattern is formed; a step of peeling off the liquid crystal layer for lamination from the photo-alignment film for lamination, and a step of laminating the peeled liquid crystal layer for lamination on the first liquid crystal layer or the liquid crystal layer for lamination.

The liquid crystal layer lamination step is optionally performed. In addition, in a case where the liquid crystal layer lamination step is performed, the liquid crystal layer lamination step may be performed once or more.

Accordingly, the optical element according to the embodiment of the present invention that is manufactured using the manufacturing method according to the embodiment of the present invention may include: a bonding layer that is provided on a light guide plate; and only a first organic layer on the bonding layer. Alternatively, the optical element according to the embodiment of the present invention that is manufactured using the manufacturing method according to the embodiment of the present invention may include: a bonding layer that is provided on a light guide plate; a first organic layer that is provided on the bonding layer; and one or more liquid crystal layers for lamination that are provided on the first organic layer. Alternatively, the optical element according to the embodiment of the present invention that is manufactured using the manufacturing method according to the embodiment of the present invention may include: a bonding layer that is provided on a light guide plate; a first organic layer that is provided on the bonding layer; and a plurality of liquid crystal layers for lamination such as two layers or three layers that are provided on the first organic layer.

FIG. 1 is a diagram conceptually showing an example of the optical element according to the embodiment of the present invention.

As shown in FIG. 1, a light guide element 10 includes a light guide plate 12, an incidence diffraction unit 14, and an emission diffraction unit 16.

The incidence diffraction unit 14 is provided in the vicinity of one end part of one main surface of the light guide plate 12, and the emission diffraction unit 16 is provided in the vicinity of another end part of the same main surface of the light guide plate 12.

For example, the light guide element 10 in the example shown in the drawing corresponds to display of two color images including a red image and a green image.

The incidence diffraction unit 14 includes an R incidence liquid crystal layer 14R, a G incidence liquid crystal layer 14G, and an adhesive layer 14A. Both of the R incidence liquid crystal layer 14R and the G incidence liquid crystal layer 14G are liquid crystal diffraction elements, the R incidence liquid crystal layer 14R selectively diffracts red (R) light, and the G incidence liquid crystal layer 14G selectively diffracts green (G) light.

On the other hand, the emission diffraction unit 16 includes an R emission liquid crystal layer 16R, a G emission liquid crystal layer 16G, and an adhesive layer 16A. Both of the R emission liquid crystal layer 16R and the G emission liquid crystal layer 16G are liquid crystal diffraction elements, the R emission liquid crystal layer 16R selectively diffracts red light, and the G emission liquid crystal layer 16G selectively diffracts green light.

Both of the incidence diffraction unit 14 and the emission diffraction unit 16 are the optical elements according to the embodiment of the present invention that are manufactured using the method of manufacturing an optical element according to the embodiment of the present invention. In the incidence diffraction unit 14, the G incidence liquid crystal layer 14G corresponds to the first liquid crystal layer according to the embodiment of the present invention, and the R incidence liquid crystal layer 14R corresponds to the liquid crystal layer for lamination according to the embodiment of the present invention. In addition, in the emission diffraction unit 16, the G emission liquid crystal layer 16G corresponds to the first liquid crystal layer according to the embodiment of the present invention, and the R emission liquid crystal layer 16R corresponds to the liquid crystal layer for lamination according to the embodiment of the present invention.

However, the present invention is not limited to this configuration.

For example, in the incidence diffraction unit 14, the R incidence liquid crystal layer 14R may correspond to the first liquid crystal layer according to the embodiment of the present invention, and the G incidence liquid crystal layer 14G may correspond to the liquid crystal layer for lamination according to the embodiment of the present invention. In addition, in the emission diffraction unit 16, the R emission liquid crystal layer 16R may correspond to the first liquid crystal layer according to the embodiment of the present invention, and the G emission liquid crystal layer 16G may correspond to the liquid crystal layer for lamination according to the embodiment of the present invention. Regarding this point, the same can also be applied to a case where three or more liquid crystal layers are provided, for example, a case where the liquid crystal layers include a liquid crystal layer that selectively diffracts blue (B) light.

That is, in the present invention, in a case where two more liquid crystal layers are formed, all of the liquid crystal layers may be the first liquid crystal layers.

All of the R incidence liquid crystal layer 14R, the G incidence liquid crystal layer 14G, the R emission liquid crystal layer 16R, and the G emission liquid crystal layer 16G are reflective liquid crystal diffraction elements in a preferable aspect.

In the light guide element 10 in the example shown in the drawing, a red image R and a green image G in a two-color image displayed by a display element (not shown) transmit through the light guide plate 12, are diffracted and reflected by the R incidence liquid crystal layer 14R and the G incidence liquid crystal layer 14G in the incidence diffraction unit 14, respectively, and are incident into the light guide plate 12.

The red image R and the green image G incident into the light guide plate 12 propagate in the light guide plate 12 while being repeatedly totally reflected, and are incident into the emission diffraction unit 16.

The red image R and the green image G incident into the emission diffraction unit 16 are diffracted and reflected by the R emission liquid crystal layer 16R and the G emission liquid crystal layer 16G, respectively, transmit through the light guide plate 12, are emitted to an observation position by a user U, and are observed as two color images including a red image and a green image.

Accordingly, the optical element according to the embodiment of the present invention that is manufactured using the manufacturing method according to the embodiment of the present invention is not limited to that corresponding to two color images including a red image and a green image.

For example, in a case where the optical element according to the embodiment of the present invention corresponds to a full color image including a red image, a green image, and a blue image, the incidence diffraction unit 14 further includes a B incidence liquid crystal layer that selectively diffracts and reflects blue light, and the emission diffraction unit 16 further includes a B emission liquid crystal layer that selectively diffracts and reflects blue light. Alternatively, as described above, the incidence diffraction unit 14 and the emission diffraction unit 16 may include four or more liquid crystal layers.

In addition, in a case where the optical element according to the embodiment of the present invention corresponds to a monochromic image, for example, the incidence diffraction unit 14 may include only the R incidence liquid crystal layer 14R or the G incidence liquid crystal layer 14G, and the emission diffraction unit 16 may include only the R emission liquid crystal layer 16R or the G emission liquid crystal layer 16G.

Hereinafter, the various components forming the optical element according to the embodiment of the present invention that is manufacturing method according to the embodiment of the present invention will be described.

[Light Guide Plate]

The light guide plate 12 is a well-known light guide plate that reflects light incident thereinto and propagates (guides) the reflected light.

As the light guide plate 12, various well-known light guide plates used for a backlight unit or the like of AR glasses or a liquid crystal display can be used without any particular limitation.

[Incidence Diffraction Unit and Emission Diffraction Unit]

The incidence diffraction unit 14 includes an R incidence liquid crystal layer 14R, a G incidence liquid crystal layer 14G, and an adhesive layer 14A.

In a preferable aspect, both of the R incidence liquid crystal layer 14R and the G incidence liquid crystal layer 14G are reflective polarization diffraction elements. Specifically, the R incidence liquid crystal layer 14R and the G incidence liquid crystal layer 14G are cholesteric liquid crystal layers obtained by immobilizing a cholesteric liquid crystalline phase, and selectively reflect right circularly polarized light or left circularly polarized light.

In the R incidence liquid crystal layer 14R and the G incidence liquid crystal layer 14G, the turning directions of circularly polarized light to be selectively reflected, that is, the helical twisted directions of the liquid crystal compounds in the cholesteric liquid crystalline phases may be the same as or different from each other. In this example, for example, both of the R incidence liquid crystal layer 14R and the G incidence liquid crystal layer 14G selectively reflect right circularly polarized light.

On the other hand, the emission diffraction unit 16 includes an R emission liquid crystal layer 16R, a G emission liquid crystal layer 16G, and an adhesive layer 16A.

In a preferable aspect, both of the R emission liquid crystal layer 16R and the G emission liquid crystal layer 16G are reflective polarization diffraction elements. Specifically, the R emission liquid crystal layer 16R and the G emission liquid crystal layer 16G are cholesteric liquid crystal layers obtained by immobilizing a cholesteric liquid crystalline phase, and selectively reflect right circularly polarized light or left circularly polarized light.

In the R emission liquid crystal layer 16R and the G emission liquid crystal layer 16G, the turning directions of circularly polarized light to be selectively reflected, that is, the helical twisted directions of the liquid crystal compounds in the cholesteric liquid crystalline phases may be the same as or different from each other.

In this example, for example, both of the R emission liquid crystal layer 16R and the G emission liquid crystal layer 16G selectively reflect right circularly polarized light.

In the incidence liquid crystal layer and the emission liquid crystal layer that selectively reflects the same color, the turning directions of circularly polarized light to be selectively reflected may be the same as or different from each other.

The R incidence liquid crystal layer 14R and the G incidence liquid crystal layer 14G have basically the same configuration and the R emission liquid crystal layer 16R and the G emission liquid crystal layer 16G have basically the same configuration, except that wavelength ranges of light to be selectively reflected are different from each other.

Accordingly, in the following description, in a case where the liquid crystal layers do not need to be distinguished from each other, these liquid crystal layers will also be collectively referred to as "liquid crystal layer".

(Liquid Crystal Layer)

The liquid crystal layer will be described using FIGS. 2 to 4.

Figure 2:
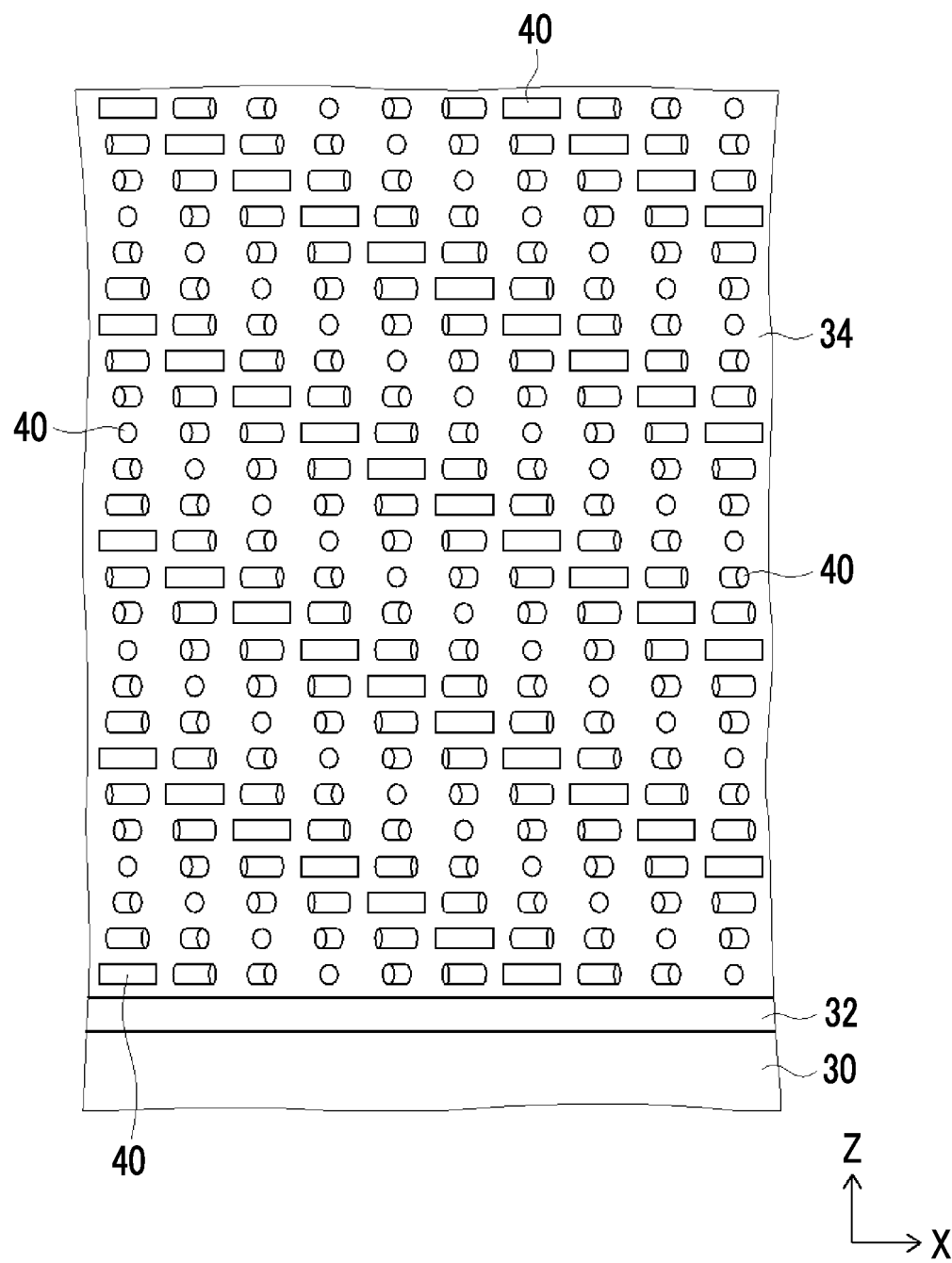
FIG. 2 is a diagram conceptually showing an example of a diffraction element.

FIG. 2 is a diagram conceptually showing a layer configuration in a liquid crystal layer forming step in the manufacturing method according to the embodiment of the present invention. Specifically, the liquid crystal layer forming step includes a first liquid crystal layer forming step and a liquid crystal layer lamination step.

As conceptually shown in FIG. 2, during the formation of the liquid crystal layer, a photo-alignment film 32 is formed on a support 30, and a cholesteric liquid crystal layer 34 that functions as a liquid crystal diffraction element is formed on the photo-alignment film 32.

Although described below, in the manufacturing method according to the embodiment of the present invention and the optical element according to the embodiment of the present invention that is manufactured using the manufacturing method according to the embodiment of the present invention, the cholesteric liquid crystal layer 34 is peeled off from the photo-alignment film 32 in the subsequent operation. Specifically, the subsequent operation refers to the first liquid crystal layer peeling step and the step of peeling off the liquid crystal layer for lamination.

Figure 3:
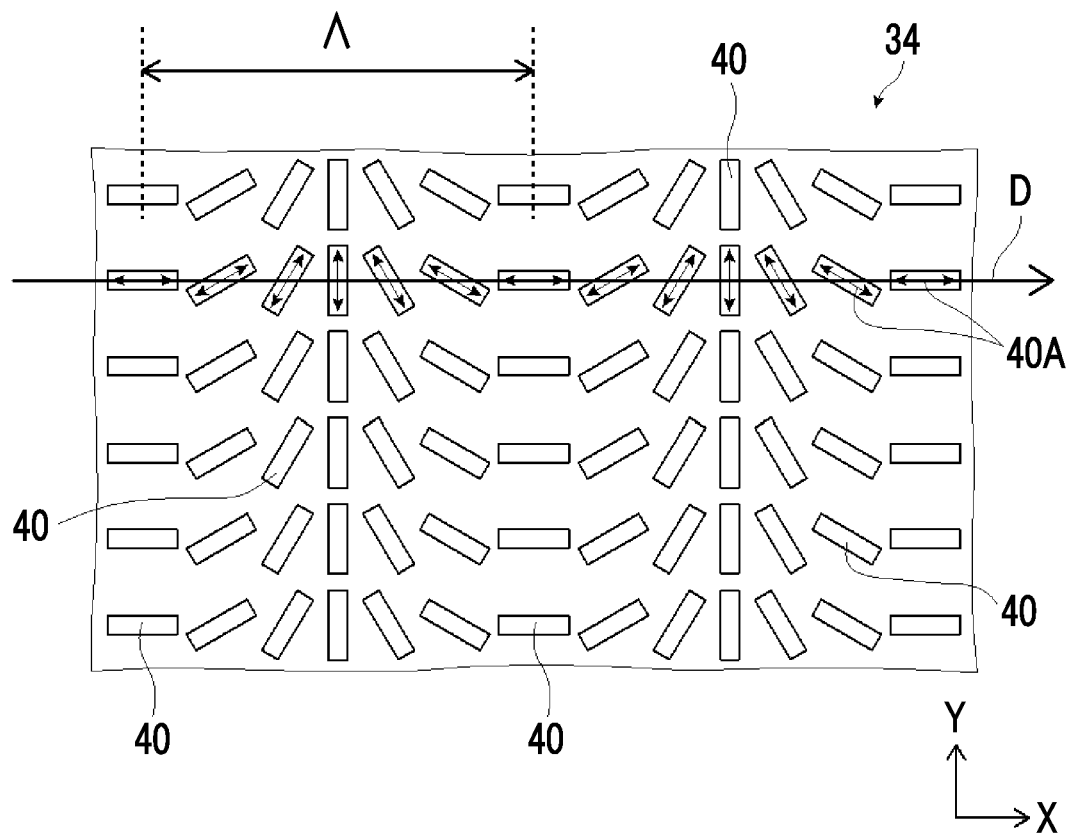
FIG. 3 is a plan view conceptually showing a liquid crystal layer of the diffraction element shown in FIG. 2.

FIG. 3 is a schematic diagram showing an alignment state of a liquid crystal compound in a plane of a main surface of the cholesteric liquid crystal layer 34.

In the following description, it is assumed that a main surface of the cholesteric liquid crystal layer 34 is an X-Y plane and a cross-section perpendicular to the X-Y plane is a X-Z plane. That is, FIG. 2 corresponds to a schematic diagram of the X-Z plane of the cholesteric liquid crystal layer 34, and FIG. 3 corresponds to a schematic diagram of the X-Y plane of the cholesteric liquid crystal layer 34.

Figure 4:
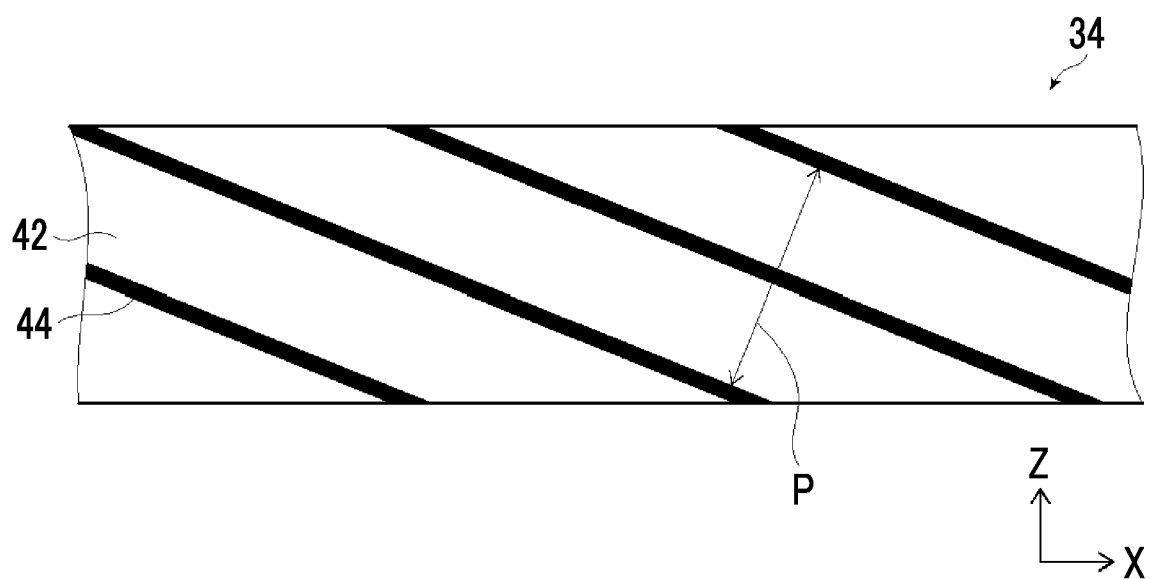
FIG. 4 is a diagram conceptually showing a cross-sectional scanning electron microscope (SEM) image of the liquid crystal layer shown in FIG. 3.

As shown in FIGS. 2 to 4, the cholesteric liquid crystal layer 34 is a layer obtained by cholesteric alignment of a liquid crystal compound. In addition, FIGS. 2 to 4 show an example in which the liquid crystal compound forming the cholesteric liquid crystal layer is a rod-like liquid crystal compound.

In the following description, the cholesteric liquid crystal layer will also be referred to as "liquid crystal layer".

<Support>

The support 30 supports the photo-alignment film 32 and the liquid crystal layer 34.

As the support 30, various sheet-shaped materials (films or plate-shaped materials) can be used as long as they can support the photo-alignment film 32 and the liquid crystal layer 34.

A transmittance of the support 30 with respect to corresponding light is preferably 50% or higher, more preferably 70% or higher, and still more preferably 85% or higher.

The thickness of the support 30 is not particularly limited and may be appropriately set depending on the use of the liquid crystal diffraction element, a material for forming the support 30, and the like in a range where the photo-alignment film 32 and the liquid crystal layer 34 can be supported.

The thickness of the support 30 is preferably 1 to 2000 μm, more preferably 3 to 500 μm, and still more preferably 5 to 250 μm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

In particular, from the viewpoint that, for example, the photo-alignment film 32 having high surface smoothness can be formed, glass is suitably used as the support 30.

<Photo-Alignment Film>

In the liquid crystal diffraction element, the photo-alignment film 32 is formed on a surface of the support 30.

The photo-alignment film 32 is a photo-alignment film for aligning the liquid crystal compound 40 to a predetermined liquid crystal alignment pattern during the formation of the liquid crystal layer 34.

Although described below, in the present invention, the liquid crystal layer 34 has a liquid crystal alignment pattern in which a direction of an optical axis 40A (refer to FIG. 3) derived from the liquid crystal compound 40 changes while continuously rotating in one in-plane direction. Accordingly, the photo-alignment film 32 forms an alignment pattern such that the liquid crystal layer 34 can form the liquid crystal alignment pattern.

In the following description, "the direction of the optical axis 40A rotates" will also be simply referred to as "the optical axis 40A rotates".

In the present invention, the photo-alignment film 32 includes a photo-alignment material. The photo-alignment film 32 is a so-called photo-alignment film obtained by irradiating a photo-alignment material with polarized light or non-polarized light.

The photo-alignment film 32 is formed by applying a composition including a photo-alignment material to the support 30 and, through interference exposure, forms an alignment pattern such that a direction of an optical axis 40A (refer to FIG. 3) derived from the liquid crystal compound 40 of the liquid crystal layer 34 changes while continuously rotating in one in-plane direction.

Preferable examples of the photo-alignment material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitably used.

The thickness of the photo-alignment film 32 is not particularly limited. The thickness with which a required alignment function can be obtained may be appropriately set depending on the material for forming the photo-alignment film 32.

The thickness of the photo-alignment film 32 is preferably 0.01 to 5 μm and more preferably 0.05 to 2 μm.

A method of forming the photo-alignment film 32 is not limited. Any one of various well-known methods corresponding to a material for forming the photo-alignment film 32 can be used.

Examples of the method of forming the photo-alignment film 32 include a method including: preparing a composition including a photo-alignment material for forming the photo-alignment film 32; applying this composition to a surface of the support 30; drying the applied alignment film 32; and performing interference exposure on the photo-alignment film 32 using laser light to form an alignment pattern.

Figure 8:
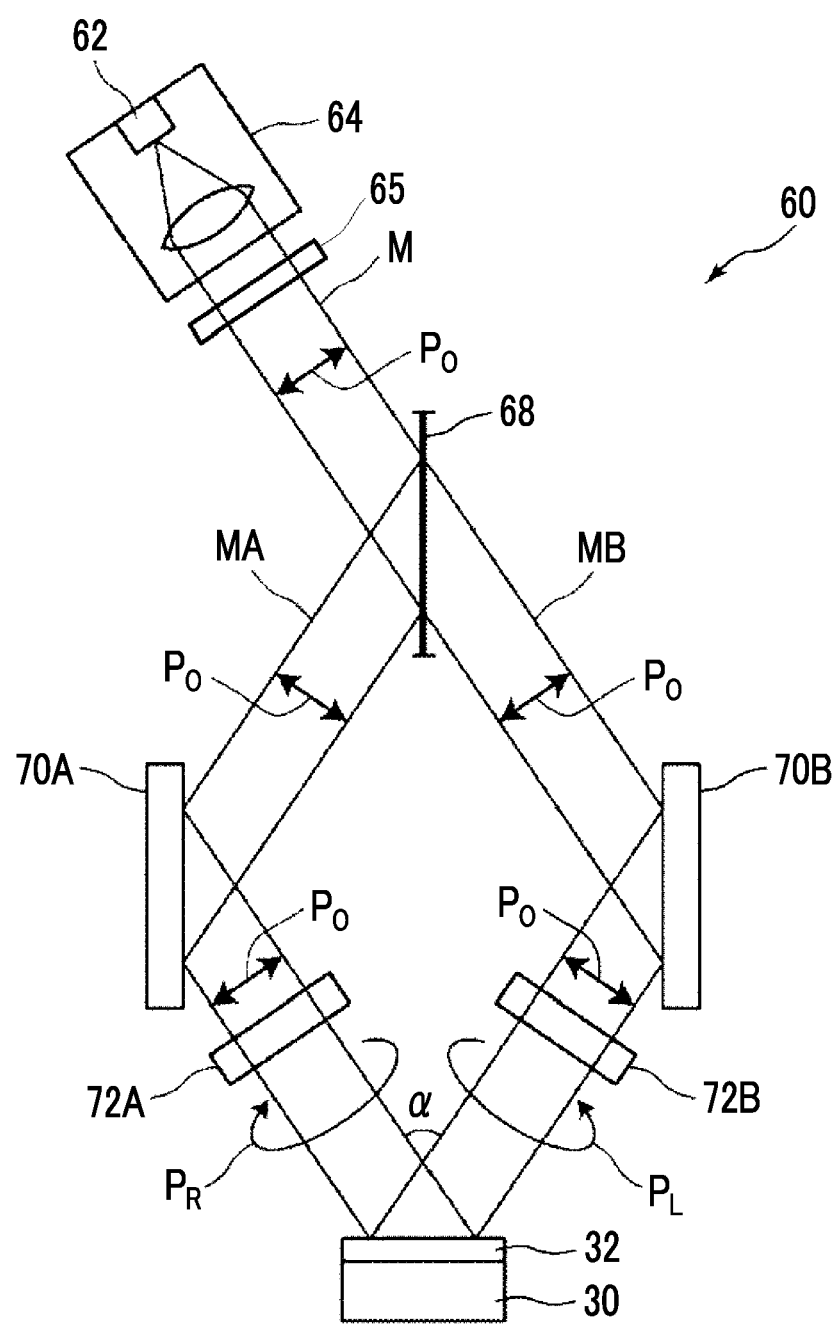
FIG. 8 is a conceptual diagram showing an example of an exposure device that exposes a photo-alignment film.

FIG. 8 conceptually shows an example of an exposure device that performs interference exposure on the photo-alignment film 32 to form an alignment pattern.

An exposure device 60 shown in FIG. 8 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the two split beams MA and MB; and λ/4 plates 72A and 72B.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 30 including the photo-alignment film 32 on which the alignment pattern is not yet formed is disposed at an exposed portion, the two beams MA and MB intersect and interfere with each other on the photo-alignment film 32, and the photo-alignment film 32 is irradiated with and exposed to the interference light.

Due to the interference in this case, the polarization state of light with which the photo-alignment film 32 is irradiated periodically changes according to interference fringes. As a result, a photo-alignment film having an alignment pattern in which the alignment state periodically changes can be obtained. In the following description, this photo-alignment film having the alignment pattern will also be referred to as "patterned photo-alignment film".

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the photo-alignment film 32 having the alignment pattern in which the alignment state periodically changes, as described below, the liquid crystal layer 34 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned photo-alignment film has an alignment pattern to obtain the liquid crystal alignment pattern in which the liquid crystal compound is aligned such that the direction of the optical axis of the liquid crystal compound in the liquid crystal layer formed on the patterned photo-alignment film changes while continuously rotating in at least one in-plane direction.

In a case where an axis in the direction in which the liquid crystal compound is aligned is an alignment axis, it can be said that the patterned photo-alignment film has an alignment pattern in which the direction of the alignment axis changes while continuously rotating in at least one in-plane direction. The alignment axis of the patterned photo-alignment film can be detected by measuring absorption anisotropy. For example, in a case where the amount of light transmitted through the patterned photo-alignment film is measured by irradiating the patterned photo-alignment film with linearly polarized light while rotating the patterned photo-alignment film, it is observed that a direction in which the light amount is the maximum or the minimum gradually changes in the one in-plane direction.

<Liquid Crystal Layer (Cholesteric Liquid Crystal Layer)>

The liquid crystal layer 34 is formed on a surface of the photo-alignment film 32.

The liquid crystal layer 34 is a cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction.

As conceptually shown in FIG. 2, the liquid crystal layer 34 has a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically turned once (rotated by 360°) and laminated is set as one helical pitch (pitch P), and plural pitches of the helically turned liquid crystal compound 40 are laminated.

As is well known, the cholesteric liquid crystalline phase exhibits selective reflectivity with respect to left or right circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

Accordingly, in the emission diffraction unit 16, in the liquid crystal layer 34 forming the R emission liquid crystal layer 16R and the G emission liquid crystal layer 16G that selectively reflect right circularly polarized light, the helical twisted direction of the cholesteric liquid crystalline phase is the right direction.

The turning direction of the cholesteric liquid crystalline phase can be adjusted by adjusting the kind of the liquid crystal compound that forms the cholesteric liquid crystal layer and/or the kind of the chiral agent to be added.

In addition, a half-width Δλ (nm) of a selective reflection range (circularly polarized light reflection range) where selective reflection is exhibited depends on Δn of the cholesteric liquid crystalline phase and the helical pitch P and satisfies a relationship of $\Delta\lambda = \Delta n \times P$. Therefore, the width of the selective reflection range can be controlled by adjusting Δn. Δn can be adjusted by adjusting a kind of a liquid crystal compound for forming the cholesteric liquid crystal layer and a mixing ratio thereof, and a temperature during alignment immobilization.

Accordingly, regarding the wavelength of light that is reflected (diffracted) by the diffraction element, the selective reflection wavelength range of the liquid crystal layer may be appropriately set, for example, by adjusting the helical pitch P of the liquid crystal layer according to each of the liquid crystal diffraction elements.

The half-width of the reflection wavelength range is adjusted depending on the use of the optical element (liquid crystal diffraction element) and may be, for example, 10 to 500 nm and is preferably 20 to 300 nm and more preferably 30 to 100 nm.

As shown in FIG. 3, in the X-Y plane of the liquid crystal layer 34, the liquid crystal compounds 40 are arranged along a plurality of arrangement axes D parallel to the X-Y plane. On each of the arrangement axes D, the direction of the optical axis 40A of the liquid crystal compound 40 changes while continuously rotating in the one in-plane direction along the arrangement axis D. Here, for the convenience of description, it is assumed that the arrangement axis D is directed to the X direction. In addition, in the Y direction, the liquid crystal compounds 40 in which the directions of the optical axes 40A are the same are arranged at regular intervals.

"The direction of the optical axis 40A of the liquid crystal compound 40 changes while continuously rotating in the one in-plane direction along the arrangement axis D" represents that angles between the optical axes 40A of the liquid crystal compounds 40 and the arrangement axes D vary depending on positions in the arrangement axis D direction and gradually change from θ to θ+180° or θ−180° along the arrangement axis D. That is, in each of the plurality of liquid crystal compounds 40 arranged along the arrangement axis D, as shown in FIG. 3, the optical axis 40A changes along the arrangement axis D while rotating on a given angle basis.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present specification, in a case where the liquid crystal compound 40 is a rod-like liquid crystal compound, the optical axis 40A of the liquid crystal compound 40 refers to a molecular major axis of the rod-like liquid crystal compound. On the other hand, in a case where the liquid crystal compound 40 is a disk-like liquid crystal compound, the optical axis 40A of the liquid crystal compound 40 refers to an axis parallel to the normal direction with respect to a disc plane of the disk-like liquid crystal compound.

In the liquid crystal layer 34, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length Λ of the single period in the liquid crystal alignment pattern.

That is, a distance between centers of two liquid crystal compounds 40 in the arrangement axis D direction is the length Λ of the single period, the two liquid crystal compounds having the same angle in the arrangement axis D direction. Specifically, as shown in FIG. 3, a distance between centers in the arrangement axis D direction of two liquid crystal compounds 40 in which the arrangement axis D direction and the direction of the optical axis 40A match each other is the length Λ of the single period. In the following description, the length Λ of the single period will also be referred to as "single period Λ".

In the liquid crystal alignment pattern of the liquid crystal layer 34, the single period Λ is repeated in the arrangement axis D direction, that is, in the one in-plane direction in which the direction of the optical axis 40A changes while continuously rotating. In the liquid crystal diffraction element, the single period Λ is the period of the diffraction structure.

On the other hand, in the liquid crystal compound 40 forming the liquid crystal layer 34, the directions of the optical axes 40A are the same in the direction (in FIG. 3, the Y direction) perpendicular to the arrangement axis D direction, that is, the Y direction perpendicular to the one in-plane direction in which the optical axis 40A continuously rotates.

In other words, in the liquid crystal compound 40 forming the liquid crystal layer 34, angles between the optical axes 40A of the liquid crystal compound 40 and the arrow X direction are the same in the Y direction.

In a case where the X-Z plane of the liquid crystal layer 34 shown in FIG. 2 is observed with a scanning electron microscope (SEM), an arrangement direction in which bright portions 42 and dark portions 44 are alternately arranged as shown in FIG. 4, a stripe pattern tilted at a predetermined angle with respect to the main surface (X-Y plane) is observed. In this SEM cross-section, an interval between the bright portions 42 adjacent to each other or between the dark portions 44 adjacent to each other in a normal direction of lines formed by the bright portions 42 or the dark portions 44 corresponds to a ½ pitch. That is, as indicated by P in FIG. 4, two bright portions 42 and two dark portions 44 correspond to one helical pitch (one helical turn), that is, the pitch P.

Hereinafter, an action of diffraction of the liquid crystal layer will be described.

In a cholesteric liquid crystal layer of the related art, a helical axis derived from a cholesteric liquid crystalline phase is perpendicular to the main surface (X-Y plane), and a reflecting surface thereof is parallel to the main surface (X-Y plane). In addition, the optical axis of the liquid crystal compound is not tilted with respect to the main surface (X-Y plane). In other words, the optical axis is parallel to the main surface (X-Y plane). Accordingly, in a case where the X-Z plane of the cholesteric liquid crystal layer in the related art is observed with a SEM, an arrangement direction in which bright portions and dark portions are alternately arranged is perpendicular to the main surface (X-Y plane).

The cholesteric liquid crystalline phase has specular reflectivity. Therefore, in a case where light is incident from the normal direction into the cholesteric liquid crystal layer, the light is reflected in the normal direction.

Figure 5:
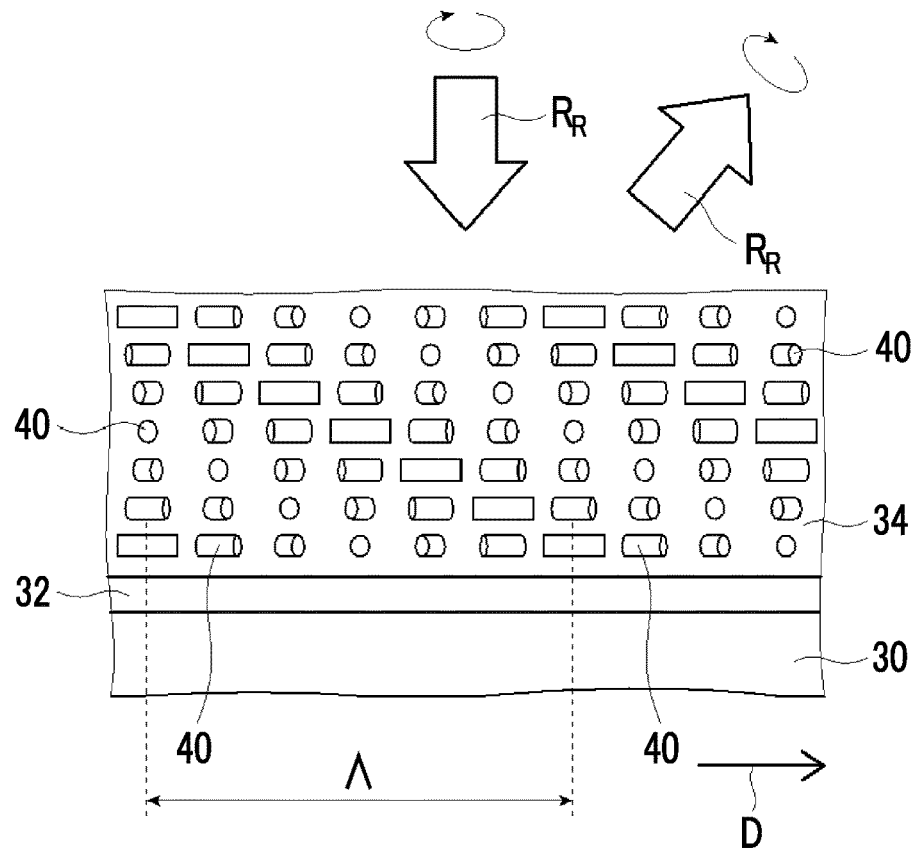
FIG. 5 is a conceptual diagram showing an action of the liquid crystal layer shown in FIG. 3.

On the other hand, the liquid crystal layer 34 reflects incident light in a state where it is tilted in the arrangement axis D direction with respect to the specular reflection. The liquid crystal layer 34 has the liquid crystal alignment pattern in which the optical axis 40A changes while continuously rotating in the arrangement axis D direction in a plane (the predetermined one in-plane direction). Hereinafter, the description will be made with reference to FIG. 5.

For example, it is assumed that the liquid crystal layer 34 is a cholesteric liquid crystal layer that selectively reflects right circularly polarized light $R_R$ of red light. Accordingly, in a case where light is incident into the liquid crystal layer 34, the liquid crystal layer 34 reflects only right circularly polarized light $R_R$ of red light and allows transmission of the other light.

Here, in the liquid crystal layer 34, the optical axis 40A of the liquid crystal compound 40 changes while rotating in the arrangement axis D direction (the one in-plane direction).

The liquid crystal alignment pattern formed in the liquid crystal layer 34 is a pattern that is periodic in the arrangement axis D direction. Therefore, as conceptually shown in FIG. 5, the right circularly polarized light $R_R$ of red light incident into the liquid crystal layer 34 is reflected (diffracted) in a direction corresponding to the period of the liquid crystal alignment pattern, and the reflected right circularly polarized light $R_R$ of red light is reflected (diffracted) in a direction tilted with respect to the XY plane in the arrangement axis D direction. The XY plane is a main surface of the cholesteric liquid crystal layer.

As a result, in a case where the liquid crystal layer 34 is applied to a light guide element or the like, the liquid crystal layer 34 can be used as a diffraction element in which light incident from a direction perpendicular to the main surface of the light guide plate can be reflected (diffracted) at an angle at which total reflection occurs in the light guide plate and the light guided in the light guide plate by total reflection can e reflected (diffracted) in a direction perpendicular to the main surface of the light guide plate.

In the liquid crystal layer 34, by appropriately setting the arrangement axis D direction as the one in-plane direction in which the optical axis 40A rotates, the reflection direction (diffraction angle) of light can be adjusted.

In addition, in a case where circularly polarized light having the same wavelength and the same turning direction is reflected, by reversing the rotation direction of the optical axis 40A of the liquid crystal compound 40 toward the arrangement axis D direction, a reflection direction of the circularly polarized light can be reversed.

That is, in FIGS. 2 and 3, the rotation direction of the optical axis 40A toward the arrangement axis D direction is clockwise, and one circularly polarized light is reflected in a state where it is tilted in the arrangement axis D direction. On the other hand, by setting the rotation direction of the optical axis 40A toward the arrangement axis D direction to be counterclockwise, one circularly polarized light is reflected in a state where it is tilted in a direction opposite to the arrangement axis D direction.

Further, in the liquid crystal layer having the same liquid crystal alignment pattern, the reflection direction is reversed by adjusting the helical turning direction of the liquid crystal compound 40, that is, the turning direction of circularly polarized light to be reflected.

For example, in a case where the helical turning direction is right-twisted, the liquid crystal layer selectively reflects right circularly polarized light, and has the liquid crystal alignment pattern in which the optical axis 40A rotates clockwise in the arrangement axis D direction. As a result, the right circularly polarized light is reflected in a state where it is tilted in the arrangement axis D direction.

In addition, for example, in a case where the helical turning direction is left-twisted, the liquid crystal layer selectively reflects left circularly polarized light, and has the liquid crystal alignment pattern in which the optical axis 40A rotates clockwise in the arrangement axis D direction. As a result, the left circularly polarized light is reflected in a state where it is tilted in a direction opposite to the arrangement axis D direction.

Accordingly, in the R incidence liquid crystal layer 14R and the G incidence liquid crystal layer 14G forming the incidence diffraction unit 14, depending on the turning direction of circularly polarized light to be selectively reflected, that is, the helical turning direction, the arrangement axis D direction and the rotation direction of the optical axis 40A in the liquid crystal alignment pattern are set such that incident light is appropriately directed to the emission diffraction unit 16.

On the other hand, in the R emission liquid crystal layer 16R and the G emission liquid crystal layer 16G forming the emission diffraction unit 16, depending on the turning direction of circularly polarized light to be selectively reflected, that is, the helical turning direction, the arrangement axis D direction and the rotation direction of the optical axis 40A in the liquid crystal alignment pattern are set such that incident light is appropriately emitted to the observation position by the user U.

In the liquid crystal diffraction element, in the liquid crystal alignment pattern of the liquid crystal compound in the liquid crystal layer, the single period $\Lambda$ as the length over which the optical axis of the liquid crystal compound rotates by 180° is the period (single period) of the diffraction structure. In addition, in the liquid crystal layer, the one in-plane direction (arrangement axis D direction) in which the optical axis of the liquid crystal compound changes while rotating is the periodic direction of the diffraction structure.

In the light guide element 10 according to the embodiment of the present invention, the length of the single period $\Lambda$ of the diffraction element is not particularly limited, and may be appropriately adjusted depending on the incidence angle into the light guide plate 12, the size of diffraction of light for emitting the light from the light guide plate 12, and the like.

The length of the single period $\Lambda$ is preferably 0.1 to 10 μm, more preferably 0.15 to 2 μm, and still more preferably 0.2 to 1 μm.

In the liquid crystal layer having the liquid crystal alignment pattern, as the single period $\Lambda$ decreases, the angle of reflected light with respect to the incidence light increases. That is, as the single period $\Lambda$ decreases, reflected light can be reflected in a state where it is largely tilted with respect to incidence light.

In addition, in the liquid crystal layer having the liquid crystal alignment pattern, the reflection angle (diffraction angle) of light varies depending on the wavelength of light to be reflected. Specifically, as the wavelength of light increases, the angle of reflected light with respect to incidence light increases.

Accordingly, in the light guide element 10 according to the embodiment of the present invention, in the R incidence liquid crystal layer 14R and G incidence liquid crystal layer 14G forming the incidence diffraction unit 14, it is preferable that a permutation of the selective reflection center wavelengths of the liquid crystal layers and a permutation of the single periods $\Lambda$ match each other. Likewise, in the R emission liquid crystal layer 16R and the G emission liquid crystal layer 16G forming the emission diffraction unit 16, it is preferable that a permutation of the selective reflection center wavelengths of the liquid crystal layers and a permutation of the single periods $\Lambda$ match each other.

Regarding this point, the same can be applied to the case where each of the incidence diffraction unit 14 and the emission diffraction unit 16 includes only three or more liquid crystal layers.

With this configuration, the incidence directions of the red image, the red image R and the green image G into the light guide plate 12 by the incidence diffraction unit 14 are made to match each other. Further, with this configuration, the emission directions of the red image R and the green image G emitted from the emission diffraction unit 16 can be made to be the same. As a result, a color image having no color shift can be emitted from the light guide plate 12 to the observation position by the user U of AR glasses.

In the example shown in FIG. 2, a configuration in which, on the X-Z plane of the liquid crystal layer 34, the optical axes 40A of the liquid crystal compound 40 is aligned to be parallel with respect to the main surface (X-Y plane) is adopted.

However, the present invention is not limited to this configuration. For example, as conceptually shown in FIG. 6, a configuration in which, on the X-Z plane of the liquid crystal layer 34, the optical axes 40A of the liquid crystal compound 40 is aligned to be tilted with respect to the main surface (X-Y plane) may be adopted.

Figure 6:
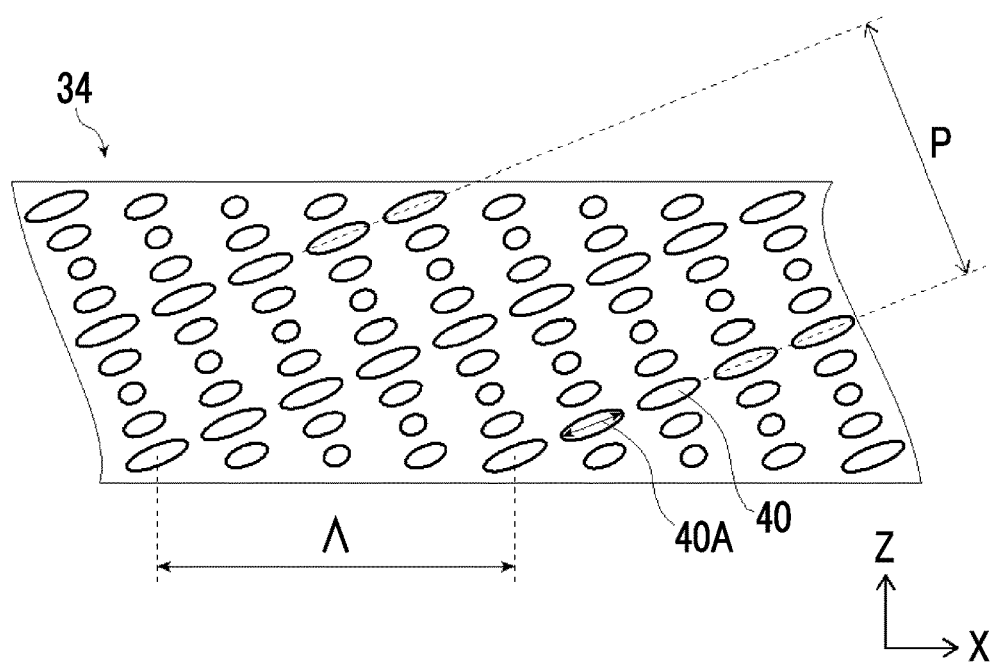
FIG. 6 is a diagram conceptually showing another example of the liquid crystal layer used in the diffraction element.

In addition, the example shown in FIG. 6 shows the configuration in which, on the X-Z plane of the liquid crystal layer 34, the tilt angle of the liquid crystal compound 40 with respect to the main surface (X-Y plane) is uniform in the thickness direction (Z direction). However, the present invention is not limited to this configuration. In the liquid crystal layer 34, a region where the tilt angle of the liquid crystal compound 40 varies in the thickness direction may be provided.

Figure 7:
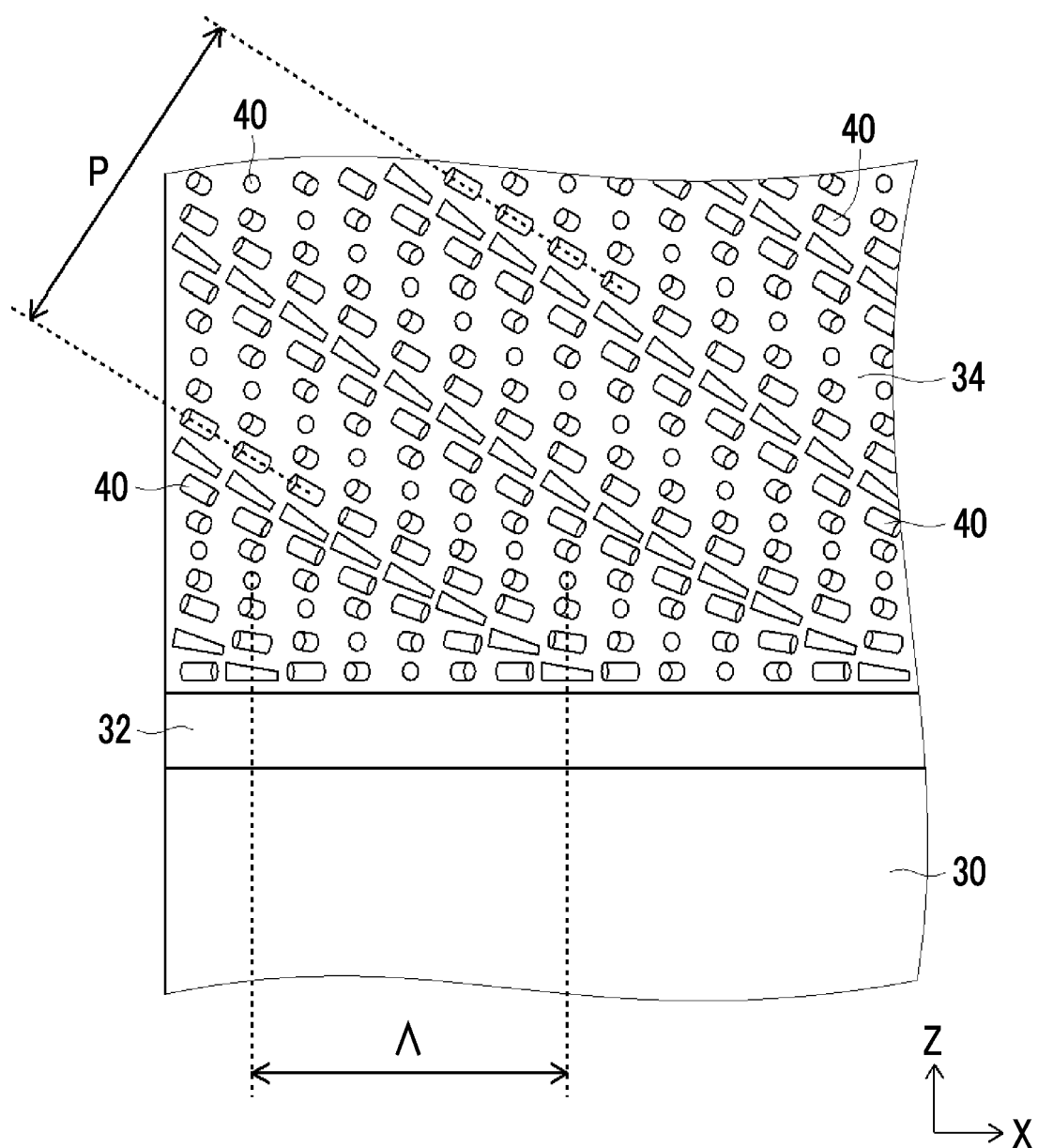
FIG. 7 is a diagram conceptually showing another example of the diffraction element.

For example, in an example shown in FIG. 7, the optical axis 40A of the liquid crystal compound 40 at an interface of the liquid crystal layer on the photo-alignment film 32 side is parallel to the main surface (the pretilt angle is 0°), the tilt angle of the liquid crystal compound 40 increases in a direction away from the interface on the photo-alignment film 32 side to the thickness direction, and the liquid crystal compound is aligned at a given tilt angle on another interface (air interface) side.

This way, the liquid crystal layer 34 may have a configuration in which the optical axis of the liquid crystal compound has a pretilt angle at one interface among the upper and lower interfaces or may have a pretilt angle at both of the interfaces. In addition, the pretilt angles at both of the interfaces may be different from each other.

The liquid crystal compound has the tilt angle (is tilted). As a result, in a case where light is diffracted, the effective birefringence index of the liquid crystal compound increases, and the diffraction efficiency can be improved.

The average angle (average tilt angle) between the optical axis 40A of the liquid crystal compound 40 and the main surface (X-Y plane) is preferably 5° to 45° and more preferably 12° to 22°. The average tilt angle can be measured by observing the X-Z plane of the liquid crystal layer 34 with a polarization microscope. In particular, it is preferable that, on the X-Z plane of the liquid crystal layer 34, the optical axis 40A of the liquid crystal compound 40 is aligned to be tilted with respect to the main surface (X-Y plane) in the same direction.

In a case where the cross-section of the cholesteric liquid crystal layer is observed with a polarization microscope, the tilt angle is a value obtained by measuring the angle between the optical axis 40A of the liquid crystal compound 40 and the main surface at any five or more positions and obtaining the average value thereof.

Light that is vertically incident into the diffraction element (liquid crystal layer 34) travels obliquely in an oblique direction in the liquid crystal layer along with a bending force. In a case where light travels in the liquid crystal layer, diffraction loss is generated due to a deviation from conditions such as a diffraction period that are set to obtain a desired diffraction angle with respect to the vertically incident light.

In a case where the liquid crystal compound is tilted, an orientation in which a higher birefringence index is generated than that in an orientation in which light is diffracted as compared to a case where the liquid crystal compound is not tilted is present. In this direction, the effective extraordinary light refractive index increases, and thus the birefringence index as a difference between the extraordinary light refractive index and the ordinary light refractive index increases.

By setting the orientation of the tilt angle according to the desired diffraction orientation, a deviation from the original diffraction conditions in the orientation can be suppressed. As a result, it is presumed that, in a case where the liquid crystal compound having a tilt angle is used, a higher diffraction efficiency can be obtained.

In addition, it is preferable that the tilt angle is controlled by treating the interface of the liquid crystal layer 34.

By pretilting the photo-alignment film on the support side interface, the tilt angle of the liquid crystal compound can be controlled. For example, by exposing the photo-alignment film to ultraviolet light from the front and subsequently obliquely exposing the photo-alignment film during the formation of the photo-alignment film, the liquid crystal compound in the liquid crystal layer formed on the photo-alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present in a plane. This configuration is suitable for improving the diffraction efficiency because it contributes to the most improvement of birefringence in the desired direction in a case where light is diffracted in the direction.

Further, an additive for promoting the pretilt angle can also be added to the liquid crystal layer or to the photo-alignment film. In this case, the additive can be used as a factor for further improving the diffraction efficiency.

This additive can also be used for controlling the pretilt angle on the air side interface.

Here, in a cross-section of the liquid crystal layer 34 observed with a SEM, the bright portions and the dark portions derived from a cholesteric liquid crystalline phase are tilted with respect to the main surface. In the liquid crystal layer, it is preferable that, in a case where an in-plane retardation Re is measured from a normal direction and a direction tilted with respect to a normal line, a direction in which the in-plane retardation Re is minimum in any one of a slow axis plane or a fast axis plane is tilted from the normal direction. Specifically, it is preferable that an absolute value of the measured angle between the direction in which the in-plane retardation Re is minimum and the normal line is 5° or more. In other words, it is preferable that the liquid crystal compound of the liquid crystal layer is tilted with respect to the main surface and the tilt direction substantially matches the bright portions and the dark portions of the liquid crystal layer. The normal direction is a direction perpendicular to the main surface.

By the liquid crystal layer having the above-described configuration, circularly polarized light can be diffracted with a higher diffraction efficiency than the liquid crystal layer in which the liquid crystal compound is parallel to the main surface.

In the configuration in which the liquid crystal compound of the liquid crystal layer is tilted with respect to the main surface and the tilt direction substantially matches the bright portions and the dark portions, bright portions and dark portions corresponding to a reflecting surface matches the optical axis of the liquid crystal compound. Therefore, the action of the liquid crystal compound on light reflection (diffraction) increases, the diffraction efficiency can be improved. As a result, the amount of reflected light with respect to incidence light can be further improved.

In the fast axis plane or the slow axis plane of the liquid crystal layer, the absolute value of the tilt angle of the optical axis of the liquid crystal layer is preferably 5° or more, more preferably 15° or more, and still more preferably 20° or more.

It is preferable that the absolute value of the tilt angle of the optical axis is 15° or more from the viewpoint that the direction of the liquid crystal compound matches the bright portions and the dark portions more suitably such that the diffraction efficiency can be improved.

<<Method of Forming Liquid Crystal Layer>>

The liquid crystal layer 34 can be formed by immobilizing a liquid crystal phase in a layer shape, the liquid crystal phase obtained by aligning a liquid crystal compound in a predetermined alignment state. For example, the cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a liquid crystal phase is immobilized. Typically, the structure in which a liquid crystal phase is immobilized is preferably a structure which is obtained by making the polymerizable liquid crystal compound to be in a state where a predetermined liquid crystal phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 40 in the liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the liquid crystal layer include a liquid crystal composition including a liquid crystal compound. It is preferable that the liquid crystal compound is a polymerizable liquid crystal compound.

In addition, the liquid crystal composition used for forming the liquid crystal layer may further include a surfactant and a chiral agent.

—Polymerizable Liquid Crystal Compound—

The polymerizable liquid crystal compound may be a rod-like liquid crystal compound or a disk-like liquid crystal compound.

Examples of the rod-like polymerizable liquid crystal compound include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Like Liquid Crystal Compound—

As the disk-like liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

—Surfactant—

The liquid crystal composition used for forming the liquid crystal layer may include a surfactant.

It is preferable that the surfactant is a compound that can function as an alignment control agent contributing to the stable or rapid alignment of a cholesteric liquid crystalline phase. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-

119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and "0082" to "0085" of JP2002-129162A, and fluorine (meth)acrylate polymers described in paragraphs "0018" to "0043" of JP2007-272185A.

The surfactants may be used alone or in combination of two or more kinds.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367, 661A, 2,367,670A), an acyloin ether (described in U.S. Pat. No. 2,448,828A), an α-hydrocarbon-substituted aromatic acyloin compound (described in US2722512A), a polynuclear quinone compound (described in U.S. Pat. Nos. 3,046,127A, 2,951,758A), a combination of a triarylimidazole dimer and p-aminophenyl ketone (described in US3549367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth) acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

—Other Additives—

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. These organic solvents may be used alone or in combination of two or more kinds. Among these, a ketone is preferable in consideration of an environmental burden.

In a case where the liquid crystal layer is formed, it is preferable that the liquid crystal layer is formed by applying the liquid crystal composition to a surface where the liquid crystal layer is to be formed, aligning the liquid crystal compound to a state of a desired liquid crystalline phase, and curing the liquid crystal compound.

That is, in a case where the cholesteric liquid crystal layer is formed on the photo-alignment film 32, it is preferable that the liquid crystal layer obtained by immobilizing a cholesteric liquid crystalline phase is formed by applying the liquid crystal composition to the photo-alignment film 32, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the liquid crystal layer. In the drying and/or heating step, the liquid crystal compound in the liquid crystal composition may be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the liquid crystal layer 34 is not particularly limited, and the thickness with which a required light reflectivity can be obtained may be appropriately set depending on the use of the diffraction element, the light reflectivity required for the liquid crystal layer 34, the material for forming the liquid crystal layer 34, and the like.

<Other Liquid Crystal Layers (Optically-Anisotropic Layers)>

In the optical element in the example shown in the drawing, in the incidence diffraction unit 14 and the emission diffraction unit 16, a reflective liquid crystal diffraction element including the liquid crystal layer 34 as a cholesteric liquid crystal layer is used. However, the present invention is not limited to this configuration.

For example, a liquid crystal layer can also be used that functions as a transmissive liquid crystal diffraction element having the liquid crystal alignment pattern where the optical axis continuously rotates in at least one in-plane direction and in which the liquid crystal compound does not form a cholesteric liquid crystalline phase in the thickness direction. The liquid crystal diffraction element may have a configuration in which the liquid crystal compound is helically twisted and rotates in the thickness direction to some extent that a cholesteric liquid crystalline phase is not formed.

In addition, in the present invention, in the incidence diffraction unit 14 and the emission diffraction unit 16, different liquid crystal diffraction elements may be used. For example, a transmissive liquid crystal diffraction element including the liquid crystal layer 36 may be used in the incidence diffraction unit 14, and a reflective liquid crystal diffraction element including the liquid crystal layer 34 may be used in the emission diffraction unit 16.

(Adhesive Layer)

In the incidence diffraction unit 14, the laminate including the R incidence liquid crystal layer 14R and the G incidence liquid crystal layer 14G is bonded to the light guide plate 12 using the adhesive layer 14A.

In the emission diffraction unit 16, the laminate including the R emission liquid crystal layer 16R and the G emission liquid crystal layer 16G is bonded to the light guide plate 12 using the adhesive layer 16A.

The adhesive layer 14A and the adhesive layer 16A will be described below in detail.

[Method of Preparing Incidence Diffraction Unit and Emission Diffraction Unit]

Hereinafter, by describing a method of forming the emission diffraction unit 16 with reference to the conceptual diagram of FIG. 9, the method of manufacturing an optical element according to the embodiment of the present invention and the optical element according to the embodiment of the present invention will be described in more detail.

The incidence diffraction unit 14 can be prepared using the same method as that of the emission diffraction unit 16, except that the R incidence liquid crystal layer 14R and the G incidence liquid crystal layer 14G are used instead of the R emission liquid crystal layer 16R and the G emission liquid crystal layer 16G and the adhesive layer 14A is used instead of the adhesive layer 16A.

In addition, in the following description, a first support 30a and a support for lamination 30b are the same as the above-described support 30. In addition, a first photo-alignment film 32a and a photo-alignment film for lamination 32b are the same as the above-described photo-alignment film 32.

First, the first support 30a for forming the G emission liquid crystal layer 16G is prepared. As described above, in the example, the G emission liquid crystal layer 16G is the first liquid crystal layer according to the embodiment of the present invention.

In addition, as described above, a composition including a photo-alignment material for forming the first photo-alignment film 32a is prepared.

Figure 9:
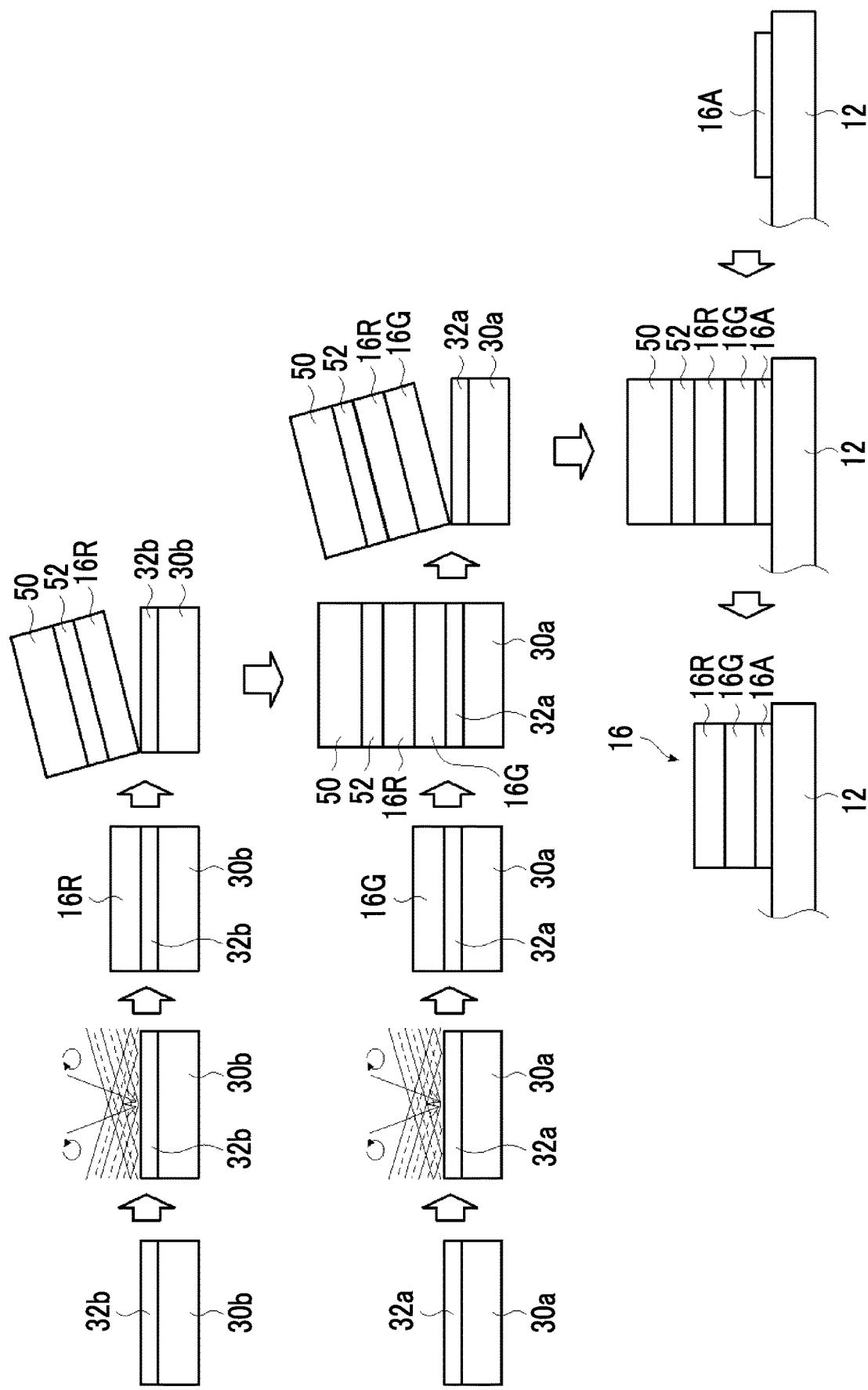
FIG. 9 is a conceptual diagram showing an example of a method of manufacturing an optical element according to the present invention.

In addition, as shown on the left side of the middle section of FIG. 9, this composition is applied to a surface of the first support 30a and dried to form the first photo-alignment film 32a.

Next, as shown on the second drawing from the left of the middle section of FIG. 9, interference exposure is performed on the first photo-alignment film 32a, for example, using the exposure device 60 to form an alignment pattern on the first photo-alignment film 32a, the alignment pattern being a pattern in which the direction of the optical axis 40A derived from the liquid crystal compound 40 of the G emission liquid crystal layer 16G changes while continuously rotating in the one in-plane direction.

On the other hand, as described above, a liquid crystal composition for forming the G emission liquid crystal layer 16G is prepared, the liquid crystal composition including a liquid crystal compound and a chiral agent.

While forming the alignment pattern on the first photo-alignment film 32a, the liquid crystal composition for forming the G emission liquid crystal layer 16G is applied to the first photo-alignment film 32a and is dried and/or heated. As a result, the liquid crystal compound in the liquid crystal composition is aligned to a cholesteric liquid crystalline phase, and the liquid crystal composition is further cured by irradiation with ultraviolet light or the like to form the G emission liquid crystal layer 16G as shown in the third drawing from the left of the middle section of FIG. 9.

On the other hand, the support for lamination 30b for forming the R emission liquid crystal layer 16R is prepared. As described above, in the example, the R emission liquid crystal layer 16R is the liquid crystal layer for lamination according to the embodiment of the present invention.

In addition, as described above, a composition including a photo-alignment material for forming the photo-alignment film for lamination 32b is prepared.

In addition, as shown on the left side of the upper section of FIG. 9, this composition is applied to a surface of the support for lamination 30b and dried to form the photo-alignment film for lamination 32b.

Next, as shown on the second drawing from the left of the upper section of FIG. 9, interference exposure is performed on the photo-alignment film for lamination 32b, for example, using the exposure device 60 to form an alignment pattern on the photo-alignment film for lamination 32b, the alignment pattern being a pattern in which the direction of the optical axis 40A derived from the liquid crystal compound 40 of the R emission liquid crystal layer 16R changes while continuously rotating in the one in-plane direction.

On the other hand, as described above, a liquid crystal composition for forming the R emission liquid crystal layer 16R is prepared, the liquid crystal composition including a liquid crystal compound and a chiral agent.

While forming the alignment pattern on the photo-alignment film for lamination 32b, the liquid crystal composition for forming the R emission liquid crystal layer 16R is applied to the photo-alignment film for lamination 32b and is dried and/or heated. As a result, the liquid crystal compound in the liquid crystal composition is aligned to a cholesteric liquid crystalline phase. Further, the liquid crystal composition is cured by irradiation with ultraviolet light or the like to form the R emission liquid crystal layer 16R as shown in the third drawing from the left of the upper section of FIG. 9.

Next, the R emission liquid crystal layer 16R is peeled off from the photo-alignment film for lamination 32b.

A method of peeling off the R emission liquid crystal layer 16R from the photo-alignment film for lamination 32b is not particularly limited, and various well-known methods can be used.

One preferable example is a method of using a temporary support 50 including a pressure-sensitive adhesive layer 52 as shown on the right side of the upper section of FIG. 9. That is, the pressure-sensitive adhesive layer 52 is bonded to the R emission liquid crystal layer 16R and is peeled off from the photo-alignment film for lamination 32b together with the temporary support 50. The temporary support 50 is the temporary support for lamination according to the embodiment of the present invention.

As the photo-alignment film formed of the photo-alignment material, in particular, as a photo-alignment film formed of an azo-based photo-alignment material as the photo-alignment material, adhesiveness with the liquid crystal layer including the liquid crystal compound as a major component is low. Therefore, by bonding the temporary support 50 including the pressure-sensitive adhesive layer 52 and peeling off the temporary support 50, the R emission liquid crystal layer 16R can be easily peeled off from the photo-alignment film for lamination 32b.

As the temporary support 50 including the pressure-sensitive adhesive layer 52, various well-known materials such as a film obtained by forming a pressure-sensitive adhesive layer having a weak adhesive force on a resin film can be used.

Examples of the various well-known materials include: a so-called laminate film (protective films) that is used for protection of various materials and products, for example, protection of display screens of display devices, protection of surfaces of various film products, or protection of surfaces of home electric appliances; and a transfer film that is used for bonding a film (layer) formed on a support having a weak adhesive force and peeling the film from the support to bond (peel and transfer) the film to another support having a strong adhesive force.

By using the film-like temporary support 50 having flexibility, the workability of peeling the R emission liquid crystal layer 16R from the photo-alignment film for lamination 32b and the workability of bonding the R emission liquid crystal layer 16R to the G emission liquid crystal layer 16G described below can be improved.

Here, in the temporary support 50, in a case where unevenness is provided on a surface of the pressure-sensitive adhesive layer 52 in contact with the R emission liquid crystal layer 16R, the unevenness of the pressure-sensitive adhesive layer 52 is transferred to the R emission liquid crystal layer 16R such that the surface smoothness of the R emission liquid crystal layer 16R deteriorates. In a case where the surface smoothness of the R emission liquid crystal layer 16R is low, reflection of the red image R by the R emission liquid crystal layer 16R is scattered. As a result, so-called blurriness occurs in an image to be observed by the user U, and a clear image cannot be displayed.

In consideration of this point, it is preferable that the surface smoothness of the pressure-sensitive adhesive layer 52 of the temporary support 50 is high. Specifically, the surface roughness Ra of the pressure-sensitive adhesive layer 52 of the temporary support 50 is preferably 20 nm or less and more preferably 15 nm or less.

It is preferable that the surface roughness Ra of the pressure-sensitive adhesive layer 52 of the temporary support 50 is as low as possible. In consideration of the costs of the temporary support 50, the surface roughness Ra is preferably 1 nm or more.

The unevenness of the surface of the pressure-sensitive adhesive layer 52 is largely affected not only by film thickness unevenness and the like of the coating film itself but also by the unevenness of the surface of the temporary support 50. Accordingly, it is preferable that the surface roughness Ra of the temporary support 50 is also low.

In addition, in the R emission liquid crystal layer 16R (liquid crystal layer for lamination) peeled off from the photo-alignment film for lamination 32b, the surface roughness Ra of the surface on the photo-alignment film for lamination 32b side is preferably 15 nm or less and more preferably 5 nm or less.

By adjusting the surface roughness Ra of the R emission liquid crystal layer 16R peeled off from the photo-alignment film for lamination 32b to be 15 nm or less, diffuse-reflection of the red image R by the R emission liquid crystal layer 16R can be prevented, and a clear image having no blurriness can be displayed.

It is preferable that the surface roughness Ra of the R emission liquid crystal layer 16R peeled off from the photo-alignment film for lamination 32b is low. In consideration of easy formation of the R emission liquid crystal layer 16R and the like, the surface roughness R is preferably 0.5 nm or more.

In the present invention, the surface roughness Ra (arithmetic average roughness Ra) may be measured according to JIS B 0601 (2001), for example, using a commercially available device "non-contact surface-layer cross sectional shape measuring system VertScan 2.0" (manufactured by Mitsubishi Chemical Systems Inc.).

In a case where the R emission liquid crystal layer 16R is peeled off from the photo-alignment film for lamination 32b, as shown in the fourth drawing from the left of the middle section of FIG. 9, the R emission liquid crystal layer 16R is laminated on and bonded to the G emission liquid crystal layer 16G.

In the present invention, in a case where three or more liquid crystal layers are laminated, the formation of the liquid crystal layer for lamination shown in the upper section of FIG. 9 may be performed to repeat the lamination and peeling of the liquid crystal layer that is previously peeled using the temporary support 50 according to the number of liquid crystal layers to be laminated.

In addition, in the present invention, the liquid crystal layer for lamination that is laminated on the separately formed liquid crystal layer (the liquid crystal layer for lamination or the first liquid crystal layer) such as a previously formed liquid crystal layer may be a liquid crystal layer that selectively reflects light in the same wavelength range as that of the separately formed liquid crystal layer or may be a liquid crystal layer that selectively reflects light in a wavelength range different from that of the separately formed liquid crystal layer. In the present invention, it is preferable that the liquid crystal layer for lamination that is laminated on the separately formed liquid crystal layer is a liquid crystal layer that selectively reflects light in a wavelength range different from that of the separately formed liquid crystal layer.

A method of bonding the R emission liquid crystal layer 16R (first liquid crystal layer) and the G emission liquid crystal layer 16G (liquid crystal layer for lamination) is not particularly limited, and a well-known method can be used.

Examples of the bonding method including a method of bonding the R emission liquid crystal layer 16R and the G emission liquid crystal layer 16G using an adhesive layer for lamination.

The adhesive layer for lamination is not particularly limited, and various adhesives that can bond liquid crystal layers can be used depending on materials for forming the liquid crystal layers. Accordingly, as long as it has sufficient light transmittance, the adhesive layer for lamination may be a layer formed of an adhesive, may be a layer formed of a pressure sensitive adhesive, or may be a layer formed of a material having properties of both of an adhesive or a pressure sensitive adhesive. The adhesive has fluidity during bonding and is subsequently solidified. In addition, the pressure sensitive adhesive is a gelled (rubber-like) flexible solid during bonding, and the gelled state does not change subsequently.

Accordingly, the adhesive layer for lamination may be any well-known layer that is used for bonding a sheet-shaped material in an optical device or an optical member, for example, an optical clear adhesive (OCA), an optically transparent double-sided tape, or an ultraviolet curable resin.

Here, in a case where the surface of the adhesive layer for lamination is rough during the bonding of the G emission liquid crystal layer 16G and the R emission liquid crystal layer 16R, unevenness of the surface of the adhesive layer for lamination is transferred to the G emission liquid crystal layer 16G and/or the R emission liquid crystal layer 16R such that surface smoothness of the liquid crystal layer deteriorates and light is scattered by the adhesive layer for lamination.

As a result, in a case where the surface smoothness of the adhesive layer for lamination is low, reflection of the green image G by the G emission liquid crystal layer 16G and/or the red image R by the R emission liquid crystal layer 16R is scattered. As a result, so-called blurriness occurs in an image to be observed by the user U, and a clear image cannot be displayed.

In consideration of this point, it is preferable that the surface smoothness of the adhesive layer for lamination is high. Specifically, the surface roughness Ra of the adhesive layer for lamination is preferably 15 nm or less and more preferably 5 nm or less.

It is preferable that the surface roughness Ra of the adhesive layer for lamination is as low as possible. In consideration of the costs of the adhesive layer, the surface roughness Ra is preferably 0.1 nm or more.

In consideration of the above-described point, it is preferable that the adhesive layer that bonds the G emission liquid crystal layer 16G and the R emission liquid crystal layer 16R is a layer formed of an adhesive from the viewpoint that an adhesive layer for lamination having high surface smoothness can be formed using an application method.

Examples of another method of bonding the R emission liquid crystal layer 16R and the G emission liquid crystal layer 16G include a method of finally curing, during the formation of the R emission liquid crystal layer 16R and/or the G emission liquid crystal layer 16G, the R emission liquid crystal layer 16R and/or the G emission liquid crystal layer 16G after allowing the R emission liquid crystal layer 16R and/or the G emission liquid crystal layer 16G to enter a semi-cured state where a polymerizable group remains and laminating the R emission liquid crystal layer 16R and the G emission liquid crystal layer 16G. The semi-cured state is, for example, a state where about 20% to 90% of a polymerizable group remains.

Even in this method, the R emission liquid crystal layer 16R and the G emission liquid crystal layer 16G can be suitably bonded to each other by curing the liquid crystal composition in the semi-cured state. In addition, in this bonding method, the adhesive layer for lamination is not used for bonding liquid crystal layers. Therefore, inconvenience caused by the surface roughness of the adhesive layer for lamination can also be avoided.

In this method, both of the R emission liquid crystal layer 16R and the G emission liquid crystal layer 16G may be made to enter the semi-cured state. However, any one of the R emission liquid crystal layer 16R or the G emission liquid crystal layer 16G only has to be made to enter the semi-cured state.

A method of making the R emission liquid crystal layer 16R and/or the G emission liquid crystal layer 16G to enter the semi-cured state is not particularly limited, and various methods can be used.

For example, a method of curing the liquid crystal composition by irradiated with ultraviolet light in an atmosphere such as air where the oxygen concentration is high during the formation of the R emission liquid crystal layer 16R and/or the G emission liquid crystal layer 16G can also be used. As another method, a method of reducing the ultraviolet irradiation dose for curing the liquid crystal composition during the formation of the R emission liquid crystal layer 16R and/or the G emission liquid crystal layer 16G can also be used.

After bonding the R emission liquid crystal layer 16R and the G emission liquid crystal layer 16G, the G emission liquid crystal layer 16G and the first photo-alignment film 32a are peeled off from each other as shown on the right side of the middle section of FIG. 9.

Here, in the G emission liquid crystal layer 16G peeled off from the first photo-alignment film 32a, the surface roughness Ra of the surface on the first photo-alignment film 32a side is preferably 15 nm or less and more preferably 5 nm or less.

By adjusting the surface roughness Ra of the G emission liquid crystal layer 16G peeled off from the first photo-alignment film 32a to be 15 nm or less, diffuse-reflection of the green image G by the G emission liquid crystal layer 16G can be prevented, and a clear image having no blurriness can be displayed.

It is preferable that the surface roughness Ra of the G emission liquid crystal layer 16G peeled off from the first photo-alignment film 32a is low. In consideration of easy formation of the G emission liquid crystal layer 16G and the like, the surface roughness R is preferably 0.5 nm or more.

Further, the adhesive layer 16A for bonding the G emission liquid crystal layer 16G and the light guide plate 12 is formed on a position of the light guide plate 12 where the emission diffraction unit 16 is formed and/or the G emission liquid crystal layer 16G.

In the example shown in the drawing, as shown on the right side of the lower section of FIG. 9, the adhesive layer 16A is formed on the position of the light guide plate 12 where the emission diffraction unit 16 is formed.

The adhesive layer 16A for bonding the G emission liquid crystal layer 16G (first liquid crystal layer) and the light guide plate 12 may be formed on both of the light guide plate 12 and the G emission liquid crystal layer 16G. In consideration of the surface roughness Ra and the like of the adhesive layer 16A described below, it is preferable that the adhesive layer 16A is formed on only any one of the light guide plate 12 or the G emission liquid crystal layer 16G.

Here, in the manufacturing method according to the embodiment of the present invention, the surface roughness Ra of the adhesive layer 16A that is formed on the G emission liquid crystal layer 16G and/or the light guide plate 12 to bond the G emission liquid crystal layer 16G (first liquid crystal layer) and the light guide plate 12 is 15 nm or less.

The manufacturing method according to the embodiment of the present invention has the above-described configuration such that a clear image having no blurriness can be displayed in AR glasses or the like.

In AR glasses or the like, an image displayed by a display is incident into one end of a light guide plate, propagates in the light guide plate, and is emitted from another end of the light guide plate such that the image is displayed at an observation position by a user.

Here, for the incidence of light into the light guide plate and the emission of light from the light guide plate, a diffraction element filled in the light guide plate is used. As a method of filling the diffraction element into the light guide plate, bonding using an adhesive layer formed of a pressure sensitive adhesive or the like is considered.

However, according to an investigation by the present inventors, it was found that, in a case where an adhesive layer is used for bonding a diffraction element and the surface of the adhesive layer is rough, diffracted light by the diffraction element travels in various directions different from a desired direction due to the roughness of the adhesive layer.

In particular, in a case where a liquid crystal diffraction element formed of a liquid crystal layer is used as the diffraction element, roughness of the surface of the adhesive layer is transferred to the liquid crystal diffraction element such that diffracted light by the liquid crystal diffraction element is diffracted in various directions different from a desired direction.

As a result, the diffracted light by the liquid crystal diffraction element becomes scattered light, so-called blurriness occurs in a display image by AR glasses or the like, and a clear image cannot be displayed.

On the other hand, in the method of manufacturing an optical element according to the embodiment of the present invention, the surface roughness of the adhesive layer 16A for bonding the G emission liquid crystal layer 16G (first liquid crystal layer) as the liquid crystal diffraction element to the light guide plate 12 is set to 15 nm.

The manufacturing method according to the embodiment of the present invention has the above-described configuration such that the occurrence of blurriness in a display image in AR glasses or the like can be prevented, and an optical element that can display a clear image can be manufactured.

In a case where the surface roughness Ra of the adhesive layer 16A is more than 15 nm, inconvenience caused by the occurrence of blurriness in a display image in AR glasses or the like occurs.

The surface roughness of the adhesive layer 16A is preferably 15 nm or less and more preferably 5 nm or less.

It is preferable that the surface roughness Ra of the adhesive layer 16A is as low as possible. In consideration of easy formation of the adhesive layer 16A and the like, the surface roughness Ra is preferably 0.1 nm or more.

As the adhesive layer 16A, various well-known adhesive layers can be used as long as they can bond the light guide plate 12 and the G emission liquid crystal layer 16G depending on material for forming the light guide plate 12 and the G emission liquid crystal layer 16G.

Accordingly, the adhesive layer 16A may be a layer formed of an adhesive, may be a layer formed of a pressure sensitive adhesive, or may be a layer formed of a material having properties of both of an adhesive or a pressure sensitive adhesive. Accordingly, the bonding layer may be any well-known layer that is used for bonding a sheet-shaped material in an optical device or an optical member, for example, an optical clear adhesive (OCA), an optically transparent double-sided tape, or an ultraviolet curable resin.

In particular, it is preferable that the adhesive layer 16A that bonds the light guide plate 12 and the G emission liquid crystal layer 16G is a layer formed of an adhesive from the viewpoint that an adhesive layer having high surface smoothness can be formed using an application method.

After forming the adhesive layer 16A on the light guide plate 12, the adhesive layer 16A is bonded to the G emission liquid crystal layer 16G as shown in the second drawing from the right of the lower section of FIG. 9.

Further, as shown in the third drawing from the right of the lower section of FIG. 9, the temporary support 50 (pressure-sensitive adhesive layer 52) is peeled off from the R emission liquid crystal layer 16R (liquid crystal layer for lamination) to form the emission diffraction unit 16.

As described above, in the method of manufacturing an optical element according to the embodiment of the present invention, only one liquid crystal layer (first liquid crystal layer) may be formed on the light guide plate.

In this case, as shown in the upper section of FIG. 9, the G emission liquid crystal layer 16G may be formed, the G emission liquid crystal layer 16G may be peeled off from the photo-alignment film using the temporary support 50 including the pressure-sensitive adhesive layer 52, and the G emission liquid crystal layer 16G may be bonded to the light guide plate 12 using the adhesive layer 16A as described above.

That is, the first photo-alignment film 32a is formed on the first support 30a using the same method as shown in the upper section of FIG. 9, except that the first support 30a is used instead of the support for lamination 30b and the first photo-alignment film 32a is used instead of the photo-alignment film for lamination 32b, and interference exposure is performed using the exposure device 60 to form an alignment pattern. Next, likewise, the G emission liquid crystal layer 16G (first liquid crystal layer) is formed.

Next, the temporary support 50 including the pressure-sensitive adhesive layer 52 is bonded to the G emission liquid crystal layer 16G, and the G emission liquid crystal layer 16G is peeled off from the first photo-alignment film 32a using the temporary support 50. In this case, due to the above-described reason, the surface roughness Ra of the temporary support 50 is preferably 20 nm or less, and the surface roughness Ra of the surface of the peeled G emission liquid crystal layer 16G on the first photo-alignment film 32a side is preferably 15 nm or less. In addition, in this case, the temporary support 50 is the first temporary support according to the embodiment of the present invention.

Subsequently, the G emission liquid crystal layer 16G may be bonded to the light guide plate 12 where the adhesive layer 16A is formed using the same method as described above.

In the optical element according to the embodiment of the present invention, in a case where measurement light is incident from the light guide plate side and the measurement light and the light guide plate are moved relative to each other while receiving diffracted light that is diffracted by the liquid crystal layer, an intensity variation of the diffracted light is within ±40%.

Figure 10:
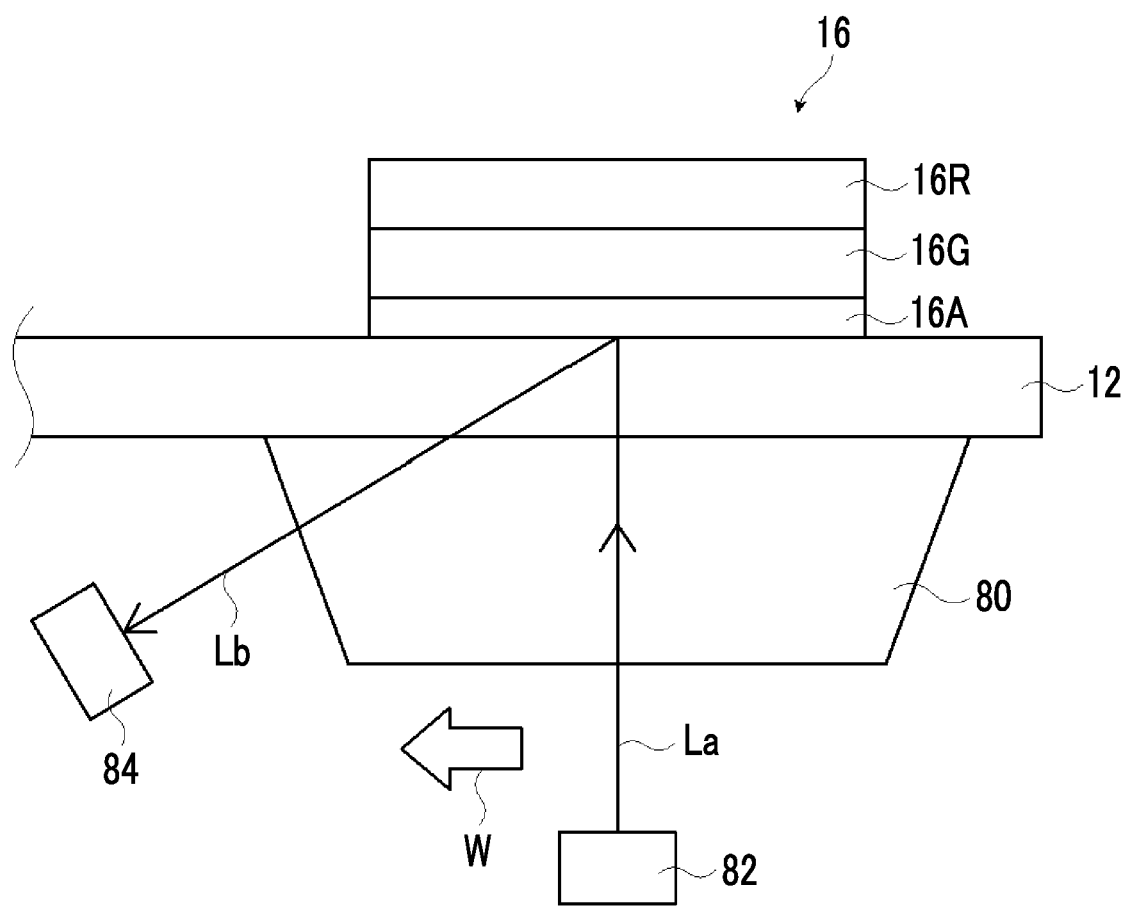
FIG. 10 is a conceptual diagram showing an example of a method of measuring an intensity variation of diffracted light by an optical element.

For example, in FIG. 10 conceptually showing the emission diffraction unit 16, a dove prism 80 is mounted on the light guide plate 12. In addition, in a case where measurement light La is incident into the emission diffraction unit 16 from a light source 82 and diffracted light Lb diffracted by the R emission liquid crystal layer 16R and the G emission liquid crystal layer 16G is received by a detector 84, the light intensity (for example, brightness) is measured.

This measurement is performed while integrally moving the light source 82 and the detector 84 to scan the liquid crystal layer with the measurement light La as indicated by an arrow W in the drawing. Alternatively, the light guide plate (light guide element) may be moved to scan the liquid crystal layer with the measurement light La.

In a case where the R emission liquid crystal layer 16R and the G emission liquid crystal layer 16G diffuse-reflects the measurement light La, the light intensity largely varies in the measurement. In this case, in AR glasses or the like, blurriness occurs in a display image due to diffused light by the emission diffraction unit 16, and a clear image cannot be displayed.

On the other hand, in the optical element according to the embodiment of the present invention, by setting the intensity variation of the diffracted light Lb to be ±40% or less, the diffuse-reflection by the R emission liquid crystal layer 16R and the G emission liquid crystal layer 16G can be suppressed. As a result, the occurrence of blurriness in a display image in AR glasses or the like can be prevented, and a clear image can be displayed.

In addition, in the method of manufacturing an optical element according to the embodiment of the present invention, the optical element according to the embodiment of the present invention can be suitably manufactured.

Hereinabove, the method of manufacturing an optical element and the optical element according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

(Formation of Photo-Alignment Film)

A glass substrate was used as the support (first support). The following coating liquid for forming a photo-alignment film was applied to the support by spin coating. The support on which the coating film of the coating liquid for forming a photo-alignment film was formed was dried using a hot plate at 60° C. for 60 seconds. As a result, a photo-alignment film (first photo-alignment film) was formed.

| Coating Liquid for Forming Photo-Alignment Film | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

-Material for Photo-Alignment-

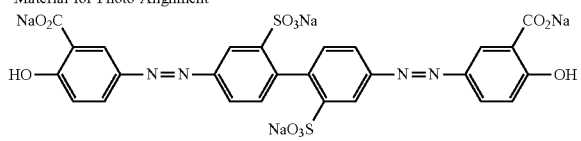

(Exposure of Photo-Alignment Film)

The photo-alignment film was exposed using the exposure device shown in FIG. 8 to form a photo-alignment film having an alignment pattern.

In the exposure device, a laser that emits laser light having a wavelength (325 nm) was used as the laser. The exposure amount of the interference light was 3000 mJ/cm$^2$. The intersecting angle (intersecting angle α) between two laser beams was 42.3°.

(Formation of R Liquid Crystal Layer)

As the liquid crystal composition forming a R liquid crystal layer, the following composition A-1 was prepared. This composition A-1 is a liquid crystal composition forming a cholesteric liquid crystal layer in which the length of one helical pitch (pitch P) in the cholesteric liquid crystalline phase is 410 nm and right circularly polarized light of red (R) light is selectively reflected. The solid content concentration in the composition A-1 was 35 wt %.

The R liquid crystal layer was formed by applying the composition A-1 to the photo-alignment film.

Specifically, the composition A-1 was applied to the photo-alignment film P-1 by spin coating, and the coating film was heated on a hot plate at 80° C. for 120 seconds. Next, the coating film was irradiated with ultraviolet light having a wavelength of 365 nm at an irradiation dose of 500 mJ/cm$^2$ using a high-pressure mercury lamp in a nitrogen atmosphere. As a result, the alignment of the liquid crystal compound was immobilized, and the R liquid crystal layer was formed. The film thickness of the obtained R liquid crystal layer was 3.5 μm.

It was verified using a polarization microscope that the liquid crystal layer of the R liquid crystal layer had a

| Composition A-1 | |
|---|---:|
| Rod-Like liquid crystal compound L-1 | 100.00 parts by mass |
| Polymerization initiator I-1 | 3.00 parts by mass |
| Chiral agent Ch-1 | 4.6 parts by mass |
| Methyl ethyl ketone | 199.83 parts by mass |

Rod-Like liquid crystal compound L-1

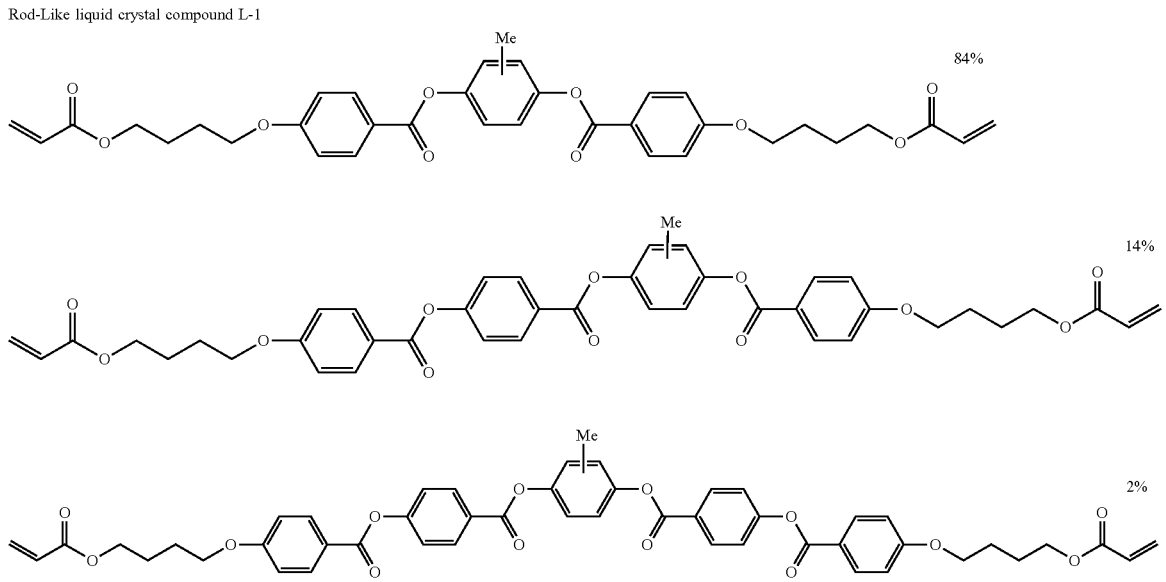

Polymerization Initiator I-1

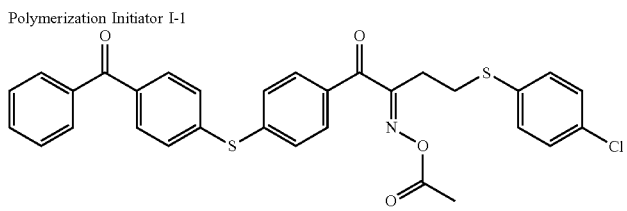

Chiral Agent Ch-1

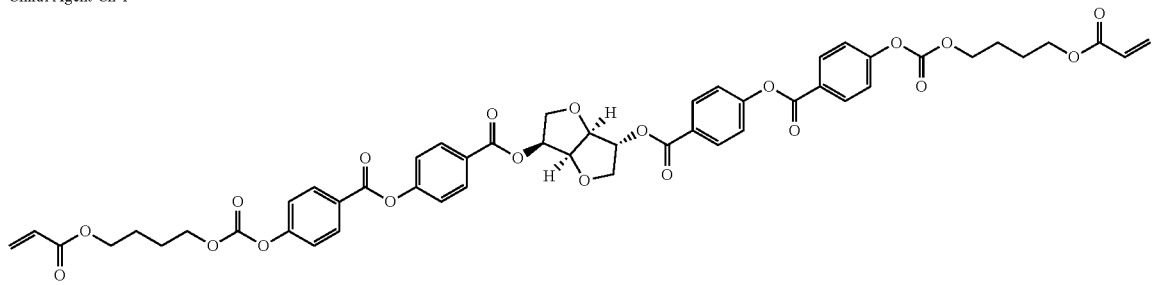

periodically aligned surface as shown in FIG. 3. In a case where a cross-section of the coating layer was observed with a SEM, in the liquid crystal alignment pattern of the liquid crystal layer of the R liquid crystal layer, the single period Λ over which the optical axis of the liquid crystal compound rotated by 180° was 0.45 μm.

(Peeling of R Liquid Crystal Layer)

A temporary support including a weak pressure-sensitive adhesive layer for transfer (manufactured by PANC Corporation, PANAPROTECT ST50) was bonded to the R liquid crystal layer, and the R liquid crystal layer was peeled from an interface between the R liquid crystal layer and the photo-alignment film.

Regarding the weak pressure-sensitive adhesive layer for transfer of the temporary support and the peeled R liquid crystal layer, the surface roughness Ra (arithmetic average roughness Ra) was calculated by performing surface shape measurement in a wave mode using a non-contact surface-layer cross sectional shape measuring system VertScan 2.0" (manufactured by Mitsubishi Chemical Systems Inc.). As a result, the surface roughness Ra of the R liquid crystal layer was 8 nm, and the surface roughness Ra of the weak pressure-sensitive adhesive layer for transfer of the temporary support was 13 nm.

In the following Examples, this measurement can be applied to all of the measurements of the surface roughness Ra.

(Formation of Adhesive Layer)

The following coating liquid for forming an adhesive layer was applied to the R liquid crystal layer peeled off from the photo-alignment film by spin coating. The temporary support on which the coating film of the coating liquid for forming an adhesive layer was formed was dried using a hot plate at 60° C. for 60 seconds. As a result, an adhesive layer formed of a urethane adhesive was formed.

The surface roughness Ra of the adhesive layer was measured using the same method as described above. As a result, the surface roughness Ra of the adhesive layer was 1 nm.

| Coating Liquid for forming Adhesive Layer | |
|---|---|
| TAKELAC A-520 (manufactured by Mitsui Chemicals Inc.) | 1.68 parts by mass |
| TAKENATE A-50 (manufactured by Mitsui Chemicals Inc.) | 0.28 parts by mass |
| Methyl ethyl ketone | 98.04 parts by mass |

(Bonding of R Liquid Crystal Layer to Light Guide Plate)

Two R liquid crystal layers where the adhesive layer was formed were prepared as an incidence diffraction unit and an emission diffraction unit and were bonded to a glass light guide plate having a thickness of 1 mm in a state where they were spaced from each other by 10 mm. The R liquid crystal layers were bonded in a state where the directions of the arrangement axes D were adjusted such that diffracted light by the incidence diffraction unit was directed to the emission diffraction unit side and diffracted light by the emission diffraction unit was directed to a direction perpendicular to the surface of the light guide plate, respectively.

After bonding, the laminate was heated on a hot plate at 80° C. for 120 seconds. Next, the temporary support was peeled off. As a result, the light guide element shown in FIG. 1 where the incidence diffraction unit included the R incidence liquid crystal layer and the emission diffraction unit included the R emission diffraction unit was prepared.

Example 2

(Formation and Peeling of R Liquid Crystal Layer)

Using the same method as that of Example 1, the photo-alignment film was formed on the surface of the support, the R liquid crystal layer was formed on the surface of the photo-alignment film, the temporary support was bonded to the R liquid crystal layer, and the R liquid crystal layer was peeled off from the photo-alignment film.

The surface roughness Ra of the R liquid crystal layer peeled off from the photo-alignment film was measured using the same method as described above. As a result, the surface roughness Ra of the adhesive layer of the R liquid crystal layer was 8 nm.

(Formation of Adhesive Layer)

An optical adhesive sheet having a thickness of 5 μm (manufactured by Lintec Corporation, Opteria NCF-D692) was bonded to the R liquid crystal layer peeled off from the photo-alignment film. As a result, an adhesive layer was obtained.

The surface roughness Ra of the adhesive layer was measured using the same method as described above. As a result, the surface roughness Ra of the adhesive layer was 9 nm.

(Bonding of R Liquid Crystal Layer to Light Guide Plate)

Two R liquid crystal layers where the adhesive layer was formed were prepared as an incidence diffraction unit and an emission diffraction unit and were bonded to a glass light guide plate having a thickness of 1 mm using the same method as that of Example 1.

After bonding, the temporary support was peeled off. As a result, the light guide element shown in FIG. 1 where the incidence diffraction unit included the R incidence liquid crystal layer and the emission diffraction unit included the R emission diffraction unit was prepared.

Comparative Example 1

The light guide element shown in FIG. 1 was prepared using the same method as that of Example 2, except that an optical adhesive sheet (SK2057) having a thickness of 23 μm (manufactured by Soken Chemical&Engineering Co., Ltd.) was used as the adhesive layer for bonding the R liquid crystal layer to the light guide plate.

The surface roughness Ra of the adhesive layer was measured using the same method as described above. As a result, the surface roughness Ra of the adhesive layer was 20 μm.

Example 3

(Formation of R Liquid Crystal Layer)

Using the same method as that of Example 1, the photo-alignment film was formed on the surface of the support, and the R liquid crystal layer (liquid crystal layer for lamination) was formed on the surface of the photo-alignment film.

(Formation and Exposure of Photo-Alignment Film for B Liquid Crystal Layer)

Using the same method as that of Example 1, the photo-alignment film (first photo-alignment film) was formed on the surface of the glass support (first support).

The formed photo-alignment film was exposed using the exposure device shown in FIG. 8 to form a photo-alignment film having an alignment pattern using the same method as described above, except that the intersecting angle (intersecting angle α) between two laser beams was 61.0°.

(Formation of B Liquid Crystal Layer)

A composition A-2 was prepared using the same method as that of the composition A-1, except that the addition amount of the chiral agent was changed to 6.3 parts by mass and the amount of methyl ethyl ketone was changed to 202.99 parts by mass. This composition A-2 is a liquid crystal composition forming a cholesteric liquid crystal layer in which the length of one helical pitch (pitch P) in the cholesteric liquid crystalline phase is 300 nm and right circularly polarized light of blue (B) light is selectively reflected.

A B liquid crystal layer (first liquid crystal layer) was formed using the same method as that of the R liquid crystal layer, except that the composition A-2 was used. In a case where the measurement was performed using the method as that of the R liquid crystal layer, in the liquid crystal alignment pattern of the B liquid crystal layer, the single period Λ over which the optical axis of the liquid crystal compound rotated by 180° was 0.32 μm.

(Peeling of R Liquid Crystal Layer)

A temporary support including a weak pressure-sensitive adhesive layer for transfer (manufactured by PANC Corporation, PANAPROTECT ST50) was bonded to the R liquid crystal layer, and the R liquid crystal layer was peeled from an interface between the R liquid crystal layer and the photo-alignment film.

The surface roughness Ra of the R liquid crystal layer peeled off from the photo-alignment film was measured using the same method as described above. As a result, the surface roughness Ra of the R liquid crystal layer was 8 nm.

(Formation of Adhesive Layer for Lamination)

An adhesive layer for lamination formed of a urethane adhesive was formed on the surface of the peeled R liquid crystal layer using the same method as that of the adhesive layer formed in the R liquid crystal layer according to Example 1.

The surface roughness Ra of the adhesive layer was measured using the same method as described above. As a result, the surface roughness Ra of the adhesive layer for lamination was 1 nm.

(Formation and Peeling of Liquid Crystal Layer Laminate 3)

The R liquid crystal layer (liquid crystal layer for lamination) where the adhesive layer for lamination was formed was laminated on and bonded to the B liquid crystal layer (first liquid crystal layer). The R liquid crystal layer and the B liquid crystal layer were laminated such that the directions of the arrangement axes D matched with each other.

The liquid crystal layer laminate 3 was heated on a hot plate at 80° C. for 120 seconds to form a liquid crystal layer laminate 3.

Next, the liquid crystal layer laminate 3 was peeled off from an interface between the photo-alignment film and the B liquid crystal layer.

The surface roughness Ra of the B liquid crystal layer peeled off from the photo-alignment film was measured using the same method as described above. As a result, the surface roughness Ra of the B liquid crystal layer was 5 nm.

(Formation of Adhesive Layer)

Using the same method as that of Example 1, an adhesive layer was formed on the surface of the B liquid crystal layer of the liquid crystal layer laminate 3 peeled from the photo-alignment film.

The surface roughness Ra of the adhesive layer was measured using the same method as described above. As a result, the surface roughness Ra of the adhesive layer was 1 nm.

(Bonding of Laminate of Liquid Crystal Layer Laminates 3 to Light Guide Plate)

Two liquid crystal layer laminates 3 where the adhesive layer was formed were prepared as an incidence diffraction unit and an emission diffraction unit and were bonded to a glass light guide plate having a thickness of 1 mm using the same method as that of Example 1.

After bonding, the temporary support was peeled off from the R liquid crystal layer at an interface between the R liquid crystal layer and the weak pressure-sensitive adhesive layer for transfer. As a result, the light guide element shown in FIG. 1 where the incidence diffraction unit included the R incidence liquid crystal layer and the B incidence liquid crystal layer and the emission diffraction unit included the R emission diffraction unit and the B emission liquid crystal layer was prepared.

Example 4

(Formation of R Liquid Crystal Layer)

Using the same method as that of Example 1, the photo-alignment film was formed on the surface of the support, and the R liquid crystal layer (liquid crystal layer for lamination) was formed on the surface of the photo-alignment film.

(Formation of B Liquid Crystal Layer)

Using the same method as that of the formation of the B liquid crystal layer according to Example 3, the photo-alignment film was formed on the surface of the support and was exposed to form a photo-alignment film having the liquid crystal alignment pattern.

The composition A-2 was applied to the formed photo-alignment film by spin coating, and the coating film was heated on a hot plate at 80° C. for 120 seconds. Next, the coating film was irradiated with ultraviolet light having a wavelength of 365 nm at an irradiation dose of 300 mJ/cm$^2$ using a high-pressure mercury lamp in an air atmosphere. As a result, the liquid crystal compound was semi-cured, and the B liquid crystal layer (first liquid crystal layer) was formed.

An infrared absorption spectrum of the B liquid crystal layer was measured, and an absorption derived from an acrylate group at 810 cm$^{-1}$ was verified.

As a result, a peak was verified at 810 cm$^{-1}$, and it was able to be verified that a polymerizable group remained and the B liquid crystal layer was in a semi-cured state.

(Peeling of R Liquid Crystal Layer)

Using the same method as that of Example 3, the temporary support was bonded to the R liquid crystal layer, and the R liquid crystal layer was peeled off from an interface between the R liquid crystal layer and the photo-alignment film.

The surface roughness Ra of the R liquid crystal layer peeled off from the photo-alignment film was measured using the same method as described above. As a result, the surface roughness Ra of the R liquid crystal layer was 8 m.

(Preparation of Liquid Crystal Layer Laminate 4)

The R liquid crystal layer (liquid crystal layer for lamination) was laminated on and bonded to the B liquid crystal layer (first liquid crystal layer) in the semi-cured state. During bonding, the R liquid crystal layer and the B liquid crystal layer were laminated such that the directions of the arrangement axes D matched with each other.

Next, the laminate was heated on a hot plate at 80° C. for 120 seconds and was irradiated with ultraviolet light having a wavelength of 365 nm from the temporary support side at an irradiation dose of 1000 mJ/cm$^2$ using a high-pressure mercury lamp in a nitrogen atmosphere. As a result, the B liquid crystal layer was finally cured, the liquid crystal layers were bonded, and the liquid crystal layer laminate 4 was prepared.

(Peeling of Liquid Crystal Layer Laminate 4)

The liquid crystal layer laminate 4 was peeled off from an interface between the photo-alignment film and the B liquid crystal layer.

The surface roughness Ra of the B liquid crystal layer was measured using the same method as described above. As a result, the surface roughness Ra of the adhesive layer of the B liquid crystal layer was 4 nm.

(Formation of Adhesive Layer)

Using the same method as that of Example 1, an adhesive layer was formed on the surface of the B liquid crystal layer of the liquid crystal layer laminate 4 peeled from the photo-alignment film.

The surface roughness Ra of the adhesive layer was measured using the same method as described above. As a result, the surface roughness Ra of the adhesive layer was 1 nm.

(Bonding of Laminate of Liquid Crystal Layer Laminates 4 to Light Guide Plate)

Two liquid crystal layer laminates 4 where the adhesive layer was formed were prepared as an incidence diffraction unit and an emission diffraction unit and were bonded to a glass light guide plate having a thickness of 1 mm using the same method as that of Example 1.

After bonding, the temporary support was peeled off from the R liquid crystal layer at an interface between the R liquid crystal layer and the weak pressure-sensitive adhesive layer for transfer. As a result, the light guide element shown in FIG. 1 where the incidence diffraction unit included the R incidence liquid crystal layer and the B incidence liquid crystal layer and the emission diffraction unit included the R emission diffraction unit and the B emission liquid crystal layer was prepared.

Example 5

(Formation of R Liquid Crystal Layer)

Using the same method as that of Example 1, the photo-alignment film was formed on the surface of the support, and the R liquid crystal layer (liquid crystal layer for lamination) was formed on the surface of the photo-alignment film.

(Formation of B Liquid Crystal Layer)

Using the same method as that of Example 3, the photo-alignment film was formed on the surface of the support, and the R liquid crystal layer (first liquid crystal layer) was formed on the surface of the photo-alignment film.

(Peeling of R Liquid Crystal Layer)

Using the same method as that of Example 3, the temporary support was bonded to the R liquid crystal layer, and the R liquid crystal layer was peeled off from an interface between the R liquid crystal layer and the photo-alignment film.

The surface roughness Ra of the R liquid crystal layer was measured using the same method as described above. As a result, the surface roughness Ra of the R liquid crystal layer was 8 m.

(Formation of Adhesive Layer for Lamination)

An optical adhesive sheet having a thickness of 5 μm (manufactured by Lintec Corporation, Opteria NCF-D692) was bonded to the R liquid crystal layer peeled off from the photo-alignment film. As a result, an adhesive layer for lamination was obtained.

The surface roughness Ra of the adhesive layer for lamination was measured using the same method as described above. As a result, the surface roughness Ra of the adhesive layer for lamination was 9 nm.

(Formation of Liquid Crystal Layer Laminate 5)

The R liquid crystal layer (liquid crystal layer for lamination) where the adhesive layer for lamination was formed was laminated on and bonded to the B liquid crystal layer (first liquid crystal layer). As a result, a liquid crystal layer laminate 5 was formed. During bonding, the R liquid crystal layer and the B liquid crystal layer were laminated such that the directions of the arrangement axes D matched with each other.

(Peeling of Liquid Crystal Layer Laminate 5)

The liquid crystal layer laminate 5 was peeled off from an interface between the photo-alignment film and the B liquid crystal layer.

The surface roughness Ra of the B liquid crystal layer was measured using the same method as described above. As a result, the surface roughness Ra of the adhesive layer of the B liquid crystal layer was 8 nm.

(Formation of Adhesive Layer)

Using the same method as that of Example 1, an adhesive layer was formed on the surface of the B liquid crystal layer of the liquid crystal layer laminate 5 peeled from the photo-alignment film.

The surface roughness Ra of the adhesive layer was measured using the same method as described above. As a result, the surface roughness Ra of the adhesive layer was 1 nm.

(Bonding of Laminate of Liquid Crystal Layer Laminates 5 to Light Guide Plate)

Two liquid crystal layer laminates 5 where the adhesive layer was formed were prepared as an incidence diffraction unit and an emission diffraction unit and were bonded to a glass light guide plate having a thickness of 1 mm using the same method as that of Example 1.

After bonding, the temporary support was peeled off from the R liquid crystal layer at an interface between the R liquid crystal layer and the weak pressure-sensitive adhesive layer for transfer. As a result, the light guide element shown in FIG. 1 where the incidence diffraction unit included the R incidence liquid crystal layer and the B incidence liquid crystal layer and the emission diffraction unit included the R emission diffraction unit and the B emission liquid crystal layer was prepared.

Example 6

(Formation of R Liquid Crystal Layer)

Using the same method as that of Example 1, the photo-alignment film was formed on the surface of the support, and the R liquid crystal layer (first liquid crystal layer for lamination) was formed on the surface of the photo-alignment film.

(Formation and Exposure of Photo-Alignment Film for G Liquid Crystal Layer)

Using the same method as that of Example 1, the photo-alignment film (photo-alignment film for lamination) was formed on the surface of the glass support (support for lamination).

The formed photo-alignment film was exposed using the exposure device shown in FIG. 8 to form a photo-alignment film having an alignment pattern using the same method as described above, except that the intersecting angle (intersecting angle α) between two laser beams was 49.2°.

(Formation of G Liquid Crystal Layer)

A composition A-3 was prepared using the same method as that of the composition A-1, except that the addition amount of the chiral agent was changed to 5.3 parts by mass and the amount of methyl ethyl ketone was changed to 200.96 parts by mass. This composition A-3 is a liquid crystal composition forming a cholesteric liquid crystal layer in which the length of one helical pitch (pitch P) in the cholesteric liquid crystalline phase is 360 nm and right circularly polarized light of green (G) light is selectively reflected.

A G liquid crystal layer (second liquid crystal layer for lamination) was formed using the same method as that of the R liquid crystal layer, except that the composition A-3 was used. In a case where the measurement was performed using the method as that of the R liquid crystal layer, in the liquid crystal alignment pattern of the G liquid crystal layer, the single period Λ over which the optical axis of the liquid crystal compound rotated by 180° was 0.39 μm.

(Formation of B Liquid Crystal Layer)

Using the same method as that of Example 3, the photo-alignment film was formed on the surface of the support, and the B liquid crystal layer (first liquid crystal layer) was formed on the surface of the photo-alignment film.

(Peeling of R Liquid Crystal Layer)

A temporary support including a weak pressure-sensitive adhesive layer for transfer (manufactured by PANC Corporation, PANAPROTECT ST50) was bonded to the R liquid crystal layer, and the R liquid crystal layer was peeled from an interface between the R liquid crystal layer and the photo-alignment film.

The surface roughness Ra of the R liquid crystal layer peeled off from the photo-alignment film was measured using the same method as described above. As a result, the surface roughness Ra of the R liquid crystal layer was 8 m.

(Formation of Adhesive Layer for Lamination on R Liquid Crystal Layer)

An adhesive layer for lamination formed of a urethane adhesive was formed on the surface of the peeled R liquid crystal layer using the same method as that of the adhesive layer formed in the R liquid crystal layer according to Example 1.

The surface roughness Ra of the adhesive layer was measured using the same method as described above. As a result, the surface roughness Ra of the adhesive layer for lamination was 1 nm.

(Lamination and Peeling of Liquid Crystal Layers)

The R liquid crystal layer (liquid crystal layer for lamination) where the adhesive layer for lamination was formed was laminated on and bonded to the G liquid crystal layer (liquid crystal layer for lamination). The R liquid crystal layer and the G liquid crystal layer were laminated such that the directions of the arrangement axes D matched with each other.

This laminate was heated on a hot plate at 80° C. for 120 seconds to form a first laminate.

Next, the first laminate was peeled off from an interface between the photo-alignment film and the G liquid crystal layer.

The surface roughness Ra of the G liquid crystal layer peeled off from the photo-alignment film was measured using the same method as described above. As a result, the surface roughness Ra of the adhesive layer was 6 nm.

(Formation of Adhesive Layer for Lamination on G Liquid Crystal Layer)

An adhesive layer for lamination formed of a urethane adhesive was formed on the surface of the peeled G liquid crystal layer using the same method as that of the adhesive layer formed in the R liquid crystal layer according to Example 1.

The surface roughness Ra of the adhesive layer was measured using the same method as described above. As a result, the surface roughness Ra of the adhesive layer for lamination was 1 nm.

(Formation and Peeling of Liquid Crystal Layer Laminate 6)

The G liquid crystal layer (liquid crystal layer for lamination) where the adhesive layer for lamination was formed was laminated on and bonded to the B liquid crystal layer (first liquid crystal layer). The G liquid crystal layer and the B liquid crystal layer were laminated such that the directions of the arrangement axes D matched with each other.

The liquid crystal layer laminate 3 was heated on a hot plate at 80° C. for 120 seconds to form a liquid crystal layer laminate 6.

Next, the liquid crystal layer laminate 6 was peeled off from an interface between the photo-alignment film and the B liquid crystal layer.

The surface roughness Ra of the B liquid crystal layer peeled off from the photo-alignment film was measured using the same method as described above. As a result, the surface roughness Ra of the adhesive layer was 4 nm.

(Formation of Adhesive Layer)

Using the same method as that of Example 1, an adhesive layer was formed on the surface of the B liquid crystal layer of the liquid crystal layer laminate 6 peeled from the photo-alignment film.

The surface roughness Ra of the adhesive layer was measured using the same method as described above. As a result, the surface roughness Ra of the adhesive layer was 1 nm.

(Bonding of Laminate of Liquid Crystal Layer Laminates 6 to Light Guide Plate)

Two liquid crystal layer laminates 6 where the adhesive layer was formed were prepared as an incidence diffraction unit and an emission diffraction unit and were bonded to a glass light guide plate having a thickness of 1 mm using the same method as that of Example 1.

After bonding, the temporary support was peeled off from the R liquid crystal layer at an interface between the R liquid crystal layer and the weak pressure-sensitive adhesive layer for transfer. As a result, the light guide element shown in FIG. 1 where the incidence diffraction unit included the R incidence liquid crystal layer, the G incidence liquid crystal layer, and the B incidence liquid crystal layer and the emission diffraction unit included the R emission liquid crystal layer, the G emission liquid crystal layer, and the B emission liquid crystal layer was prepared.

Example 7

(Formation of R Liquid Crystal Layer)

Using the same method as that of Example 1, the photo-alignment film was formed on the surface of the support, and the R liquid crystal layer (first liquid crystal layer for lamination) was formed on the surface of the photo-alignment film.

(Formation of G Liquid Crystal Layer)

Using the same method as that of the formation of the G liquid crystal layer according to Example 6, the photo-alignment film was formed on the surface of the support and was exposed to form a photo-alignment film having the liquid crystal alignment pattern.

The composition A-3 was applied to the formed photo-alignment film by spin coating, and the coating film was heated on a hot plate at 80° C. for 120 seconds. Next, the coating film was irradiated with ultraviolet light having a wavelength of 365 nm at an irradiation dose of 300 mJ/cm$^2$ using a high-pressure mercury lamp in an air atmosphere. As a result, the liquid crystal compound was semi-cured, and the G liquid crystal layer (second liquid crystal layer for lamination) was formed.

An infrared absorption spectrum of the G liquid crystal layer was measured, and an absorption derived from an acrylate group at 810 cm$^{-1}$ was verified.

As a result, a peak was verified at 810 cm$^{-1}$, and it was able to be verified that a polymerizable group remained and the G liquid crystal layer was in a semi-cured state.
(Formation of B Liquid Crystal Layer)

Using the same method as that of Example 4, the photo-alignment film was formed on the surface of the support, and the B liquid crystal layer (first liquid crystal layer) in the semi-cured state was formed on the surface of the photo-alignment film.
(Peeling of R Liquid Crystal Layer)

Using the same method as that of Example 6, the temporary support was bonded, and the R liquid crystal layer was peeled off from an interface between the R liquid crystal layer and the photo-alignment film.

The surface roughness Ra of the R liquid crystal layer peeled off from the photo-alignment film was measured using the same method as described above. As a result, the surface roughness Ra of the R liquid crystal layer was 8 m.
(Lamination of Liquid Crystal Layers)

The R liquid crystal layer (first liquid crystal layer for lamination) was laminated on and bonded to the G liquid crystal layer (second liquid crystal layer for lamination) in the semi-cured state. During bonding, the R liquid crystal layer and the G liquid crystal layer were laminated such that the directions of the arrangement axes D matched with each other.

Next, the laminate was heated on a hot plate at 80° C. for 120 seconds and was irradiated with ultraviolet light having a wavelength of 365 nm from the temporary support side at an irradiation dose of 1000 mJ/cm$^2$ using a high-pressure mercury lamp in a nitrogen atmosphere. As a result, the G liquid crystal layer was finally cured, the liquid crystal layers were bonded, and the first laminate was prepared.
(Peeling of First Laminate (G Liquid Crystal Layer))

The first laminate was peeled off from the photo-alignment film.

The surface roughness Ra of the G liquid crystal layer peeled off from the photo-alignment film was measured using the same method as described above. As a result, the surface roughness Ra of the R liquid crystal layer was 5 nm.
(Preparation and Peeling of Liquid Crystal Layer Laminate 7)

The G liquid crystal layer (second liquid crystal layer for lamination) of the first laminate was laminated on and bonded to the B liquid crystal layer (first liquid crystal layer) in the semi-cured state. During bonding, the G liquid crystal layer and the B liquid crystal layer were laminated such that the directions of the arrangement axes D matched with each other.

Next, the laminate was heated on a hot plate at 80° C. for 120 seconds and was irradiated with ultraviolet light having a wavelength of 365 nm from the temporary support side at an irradiation dose of 1000 mJ/cm$^2$ using a high-pressure mercury lamp in a nitrogen atmosphere. As a result, the B liquid crystal layer was finally cured, the liquid crystal layers were bonded, and a liquid crystal layer laminate 7 was prepared.

Next, the liquid crystal layer laminate 7 was peeled off from an interface between the photo-alignment film and the B liquid crystal layer.

The surface roughness Ra of the B liquid crystal layer peeled off from the photo-alignment film was measured using the same method as described above. As a result, the surface roughness Ra of the B liquid crystal layer was 2 nm.
(Formation of Adhesive Layer)

Using the same method as that of Example 1, an adhesive layer was formed on the surface of the B liquid crystal layer of the liquid crystal layer laminate 7 peeled from the photo-alignment film.

The surface roughness Ra of the adhesive layer was measured using the same method as described above. As a result, the surface roughness Ra of the adhesive layer was 1 nm.
(Bonding of Laminate of Liquid Crystal Layer Laminates 7 to Light Guide Plate)

Two liquid crystal layer laminates 7 where the adhesive layer was formed were prepared as an incidence diffraction unit and an emission diffraction unit and were bonded to a glass light guide plate having a thickness of 1 mm using the same method as that of Example 1.

After bonding, the temporary support was peeled off from the R liquid crystal layer at an interface between the R liquid crystal layer and the weak pressure-sensitive adhesive layer for transfer. As a result, the light guide element shown in FIG. 1 where the incidence diffraction unit included the R incidence liquid crystal layer, the G incidence liquid crystal layer, and the B incidence liquid crystal layer and the emission diffraction unit included the R emission liquid crystal layer, the G emission liquid crystal layer, and the B emission liquid crystal layer was prepared.

Example 8

(Formation of R Liquid Crystal Layer)

Using the same method as that of Example 1, the photo-alignment film was formed on the surface of the support, and the R liquid crystal layer (first liquid crystal layer for lamination) was formed on the surface of the photo-alignment film.
(Formation of G Liquid Crystal Layer)

Using the same method as that of Example 6, the photo-alignment film was formed on the surface of the support, and the G liquid crystal layer (second liquid crystal layer for lamination) was formed on the surface of the photo-alignment film.
(Formation of B Liquid Crystal Layer)

Using the same method as that of Example 3, the photo-alignment film was formed on the surface of the support, and the B liquid crystal layer (first liquid crystal layer) was formed on the surface of the photo-alignment film.
(Peeling of R Liquid Crystal Layer)

Using the same method as that of Example 6, the temporary support was bonded, and the R liquid crystal layer was peeled off from an interface between the R liquid crystal layer and the photo-alignment film.

The surface roughness Ra of the B liquid crystal layer was measured using the same method as described above. As a result, the surface roughness Ra of the R liquid crystal layer was 8 m.
(Formation of Adhesive Layer for Lamination)

An optical adhesive sheet having a thickness of 5 μm (manufactured by Lintec Corporation, Opteria NCF-D692) was bonded to the R liquid crystal layer peeled off from the photo-alignment film. As a result, an adhesive layer for lamination was obtained.

The surface roughness Ra of the adhesive layer for lamination was measured using the same method as described above. As a result, the surface roughness Ra of the adhesive layer for lamination was 9 nm.

(Lamination of Liquid Crystal Layers)

The R liquid crystal layer (first liquid crystal layer for lamination) where the adhesive layer for lamination was formed was laminated on and bonded to the G liquid crystal layer (second liquid crystal layer for lamination). As a result, a first laminate was formed. During bonding, the R liquid crystal layer and the B liquid crystal layer were laminated such that the directions of the arrangement axes D matched with each other.

(Peeling of First Laminate (G Liquid Crystal Layer))

The first laminate was peeled off from the photo-alignment film.

The surface roughness Ra of the G liquid crystal layer was measured using the same method as described above. As a result, the surface roughness Ra of the G liquid crystal layer was 8 m.

(Formation of Adhesive Layer for Lamination)

An optical adhesive sheet having a thickness of 5 μm (manufactured by Lintec Corporation, Opteria NCF-D692) was bonded to the R liquid crystal layer peeled off from the photo-alignment film. As a result, an adhesive layer for lamination was obtained.

The surface roughness Ra of the adhesive layer for lamination was measured using the same method as described above. As a result, the surface roughness Ra of the adhesive layer for lamination was 9 nm.

(Preparation and Peeling of Liquid Crystal Layer Laminate 8)

The G liquid crystal layer (second liquid crystal layer for lamination) where the adhesive layer for lamination was formed was laminated on and bonded to the B liquid crystal layer (first liquid crystal layer). As a result, a liquid crystal layer laminate 8 was formed. During bonding, the G liquid crystal layer and the B liquid crystal layer were laminated such that the directions of the arrangement axes D matched with each other.

(Peeling of Liquid Crystal Layer Laminate 8)

The liquid crystal layer laminate 8 was peeled off from an interface between the photo-alignment film and the B liquid crystal layer.

The surface roughness Ra of the B liquid crystal layer was measured using the same method as described above. As a result, the surface roughness Ra of the B liquid crystal layer was 6 nm.

(Bonding of Laminate of Liquid Crystal Layer Laminates 8 to Light Guide Plate)

Two liquid crystal layer laminates 8 where the adhesive layer was formed were prepared as an incidence diffraction unit and an emission diffraction unit and were bonded to a glass light guide plate having a thickness of 1 mm using the same method as that of Example 1.

After bonding, the temporary support was peeled off from the R liquid crystal layer at an interface between the R liquid crystal layer and the weak pressure-sensitive adhesive layer for transfer. As a result, the light guide element shown in FIG. 1 where the incidence diffraction unit included the R incidence liquid crystal layer, the G incidence liquid crystal layer, and the B incidence liquid crystal layer and the emission diffraction unit included the R emission diffraction unit, the G emission liquid crystal layer, and the B emission liquid crystal layer was prepared.

Example 9

The light guide element shown in FIG. 1 was prepared using the same method as that of Example 1, except that the temporary support including the weak pressure-sensitive adhesive layer for transfer bonded to the R liquid crystal layer to peel off the R liquid crystal layer was changed to PANAPROTECT NT50 (manufactured by PANC Corporation).

In a case where the surface roughness Ra of the weak pressure-sensitive adhesive layer for transfer of the temporary support was measured using the same method as described above, the surface roughness Ra was 28 nm.

In addition, in a case where the surface roughness Ra of the R liquid crystal layer peeled off from the photo-alignment film was measured using the same method as described above, the surface roughness Ra was 16 nm.

[Evaluation]

Regarding the prepared optical elements, a position variation in diffraction angle and whether or not blurriness occurred in an image were evaluated using the following methods.

<Variation in Diffracted Light Intensity>

As shown in FIG. 10, the dove prism 80 was mounted on a position of the prepared optical element corresponding to the emission diffraction unit. As the dove prism 80, a dove prism having a refractive index of 1.517 and a slope angle of 45° was used.

The angle of the dove prism 80 was set such that, as the measurement light La, laser light having a measurement wavelength shown in the following table emitted from the light source 82 was caused to be incident into the emission diffraction unit and diffracted light was vertically emitted from an oblique surface. The measurement light La was incident into the emission diffraction unit as right circularly polarized light through a linear polarizer and an λ/4 plate.

The intensity of diffracted light Lb by the emission diffraction unit was measured using the detector 84 (manufactured by Newport, POWER METER 1918-C). The measurement was performed by moving the light source 82 and the detector 84 to scan the emission diffraction unit with the measurement light La. As a scanning direction and the distance, a direction in which a direction of an optical axis derived from the liquid crystal compound changed while continuously rotating was set and 5 mm was set.

In a case where the diffraction angle varied depending on positions, the diffracted light intensity to be observed changed depending on measurement positions in the liquid crystal diffraction element. As the change in the diffracted light intensity depending on the measurement positions increased, the variation in diffraction angle increased.

The evaluation was performed based on the magnitude of the variation relative to the average intensity of diffracted light.

A case where the magnitude of the variation relative to the average intensity of diffracted light was less than 10% was evaluated as "A"

A case where the magnitude of the variation relative to the average intensity of diffracted light was 10% or more and less than 20% was evaluated as "B"

A case where the magnitude of the variation relative to the average intensity of diffracted light was 20% or more and less than 30% was evaluated as "C"

A case where the magnitude of the variation relative to the average intensity of diffracted light was 30% or more and less than 40% was evaluated as "D"

A case where the magnitude of the variation relative to the average intensity of diffracted light was 40% or more was evaluated as "E"

<Blurriness in Image>

As shown in FIG. 1, an image was projected to the incidence diffraction unit using a LCOS projector and was evaluated by visual inspection at an observation position.

A case where an image was clearly seen and characters were able to be clearly read was evaluated as "A"

A case where an image was blurred but characters were able to be easily read was evaluated as "B"

A case where an image was blurred and characters were able to be read with difficulty was evaluated as "C"

A case where an image was significantly blurred and characters were not able to be read was evaluated as "D"

The results are shown in the following table.

TABLE 1

| | | Example 1 | Example 2 | Comparative Example 1 | Example 3 | Example 4 | Example 5 |
|---|---|---|---|---|---|---|---|
| R Liquid Crystal Layer | Single Period A [μm] | 0.45 | 0.45 | 0.45 | 0.45 | 0.45 | 0.45 |
| | Surface Roughness Ra [μm] | 8 | 8 | 8 | 8 | 8 | 8 |
| G Liquid Crystal Layer | Single Period A [μm] | — | — | — | — | — | — |
| | Surface Roughness Ra [μm] | — | — | — | — | — | — |
| B Liquid Crystal Layer | Single Period A [μm] | — | — | — | 0.32 | 0.32 | 0.32 |
| | Surface Roughness Ra [μm] | — | — | — | 5 | 4 | 8 |
| Adhesive Layer for Liquid Crystal Layers | Kind | — | — | — | Adhesive Application 1 | None | Adhesive Sheet 9 |
| | Surface Roughness Ra [μm] | — | — | — | — | — | — |
| Adhesive Layer for Liquid Crystal Layer and Light Guide Plate | Kind | Adhesive Application 1 | Adhesive Sheet 9 | Adhesive Sheet 20 | Adhesive Application 1 | Adhesive Application 1 | Adhesive Application 1 |
| | Surface Roughness Ra [μm] | | | | | | |
| Surface Roughness of Temporary Support | | 13 | 13 | 13 | 13 | 13 | 13 |
| Blurriness | | A | B | D | B | A | B |
| Intensity Variation in Diffraction Angle | Measurement Wavelength [μm] | 632 | 632 | 632 | 632<br>450 | 632<br>450 | 632<br>450 |
| | Variation | A | C | E | B | A | C |

| | | Example 6 | Example 7 | Example 8 | Example 9 |
|---|---|---|---|---|---|
| R Liquid Crystal Layer | Single Period A [μm] | 0.45 | 0.45 | 0.45 | 0.45 |
| | Surface Roughness Ra [μm] | 8 | 8 | 8 | 16 |
| G Liquid Crystal Layer | Single Period A [μm] | 0.39 | 0.39 | 0.39 | — |
| | Surface Roughness Ra [μm] | 6 | 5 | 8 | — |
| B Liquid Crystal Layer | Single Period A [μm] | 0.32 | 0.32 | 0.32 | — |
| | Surface Roughness Ra [μm] | 4 | 2 | 6 | — |

TABLE 1-continued

| | | | | | |
|---|---|---|---|---|---|
| Adhesive Layer for Liquid Crystal Layers | Kind | Adhesive Application | None | Adhesive Sheet | — |
| | Surface Roughness Ra [μm] | 1 | — | 9 | — |
| Adhesive Layer for Liquid Crystal Layer and Light Guide Plate | Kind | Adhesive Application | Adhesive Application | Adhesive Application | Adhesive Application |
| | Surface Roughness Ra [μm] | 1 | 1 | 1 | 1 |
| Surface Roughness of Temporary Support | | 13 | 13 | 13 | 28 |
| Blurriness | | B | A | C | B |
| Intensity Variation in Diffraction Angle | Measurement Wavelength [μm] 632 / 532 / 450 | 632 / 532 / 450 | 632 / 532 / 450 | 632 / 532 / 450 | 632 |
| | Variation | B | A | D | B |

As shown in Table 1, in the optical element according to the embodiment of the present invention in which the surface roughness Ra of the adhesive layer for bonding the light guide plate and the liquid crystal layer (first liquid crystal layer) is 15 nm or less, the intensity variation in diffraction angle is small, and the blurriness in the image is also small.

In particular, as shown in Example 1, by using the application type adhesive as the adhesive layer for bonding the light guide plate and the liquid crystal layer, the surface roughness Ra of the adhesive layer can be set to be small, and the intensity variation in diffraction angle and the blurriness in the image can be further reduced. Likewise, as shown in Example 1, by using the temporary support having a small surface roughness Ra as the temporary support for peeling off the liquid crystal layer, the intensity variation in diffraction angle and the blurriness in the image can be further reduced.

In addition, in a case where two or more liquid crystal layers are provided, as shown in Examples 3 and 6, by using the application type adhesive as the adhesive layer for lamination for bonding the liquid crystal layers, the intensity variation in diffraction angle and the blurriness in the image can be further reduced. In particular, as shown in Examples 4 and 7, by making the liquid crystal layers to enter a semi-cured state, laminating the liquid crystal layers, finally curing the liquid crystal layers, and then bonding the liquid crystal layers, the intensity variation in diffraction angle and the blurriness in the image can be more suitably reduced.

As can be seen from the above results, the effects of the present invention are obvious.

The present invention is suitably applicable to various uses where light is refracted in an optical device, for example, a diffraction element that causes light to be incident into a light guide plate of AR glasses or emits light to the light guide plate.

EXPLANATION OF REFERENCES

10: light guide element
12: light guide plate
14: incidence diffraction unit
14A: adhesive layer
14R: R incidence liquid crystal layer
14G: G incidence liquid crystal layer
16: emission diffraction unit
16: adhesive layer
16R: R emission liquid crystal layer
16G: G emission liquid crystal layer
30: support
30a: first support
30b: support for lamination
32: photo-alignment film
32a: first photo-alignment film
32b: photo-alignment film for lamination
34, 36: liquid crystal layer
40: liquid crystal compound
40A: optical axis
42: bright portion
44: dark portion
50: temporary support
52: pressure-sensitive adhesive layer
60: exposure device
62: laser
64: light source
65: λ/2 plate
68: polarization beam splitter
70a, 70B: mirror
72A, 72B: λ/4 plate
80: dove prism
82: light source
84: detector
$R_R$: right circularly polarized light of red light
M: laser light
MA, MB: beam
$P_O$: linearly polarized light
$P_R$: right circularly polarized light
$P_L$: left circularly polarized light
Q: absolute phase
E, E1, E2: equiphase surface
$L_1, L_4$: incidence light
$L_2, L_5$: transmitted light
U: user
D: arrangement axis
Λ: single period (period of diffraction structure)
P: pitch

What is claimed is:

1. A method of manufacturing an optical element comprising:
    a first liquid crystal layer forming step including
        a step of forming a first photo-alignment film including a photo-alignment material on a first support,
        a step of performing first exposure by performing interference exposure on a surface of the first photo-alignment film to form, on the first photo-alignment film, an alignment pattern in which a direction of an optical axis derived from a liquid crystal compound changes while continuously rotating in at least one in-plane direction, and
        a step of forming a first liquid crystal layer by applying a liquid crystal composition including a liquid crystal compound to the first photo-alignment film on which the alignment pattern is formed;
    a liquid crystal layer lamination step that is performed once or more, the liquid crystal layer lamination step including
        a step of forming a photo-alignment film for lamination including a photo-alignment material on a support for lamination,
        a step of performing exposure for lamination by performing interference exposure on a surface of the photo-alignment film for lamination to form, on the photo-alignment film for lamination, an alignment pattern in which a direction of an optical axis derived from a liquid crystal compound changes while continuously rotating in at least one in-plane direction,
        a step of forming a liquid crystal layer for lamination by applying a liquid crystal composition including a liquid crystal compound to the photo-alignment film for lamination on which the alignment pattern is formed,
        a step of peeling off the liquid crystal layer for lamination from the photo-alignment film for lamination, and
        a step of laminating the peeled liquid crystal layer for lamination on the first liquid crystal layer or the liquid crystal layer for lamination that is separately formed;
    a first liquid crystal layer peeling step of peeling off the first liquid crystal layer from the first photo-alignment film;
    an adhesive layer forming step of forming an adhesive layer having a surface roughness Ra of 15 nm or less on a surface of at least one of a light guide plate or the first liquid crystal layer; and
    a light guide plate bonding step of bonding the light guide plate and the first liquid crystal layer to each other through the adhesive layer.

2. The method of manufacturing an optical element according to claim 1,
    wherein in the liquid crystal layer lamination step, in the step of laminating the peeled liquid crystal layer for lamination on the first liquid crystal layer or the liquid crystal layer for lamination that is separately formed,
    an adhesive layer for lamination having a surface roughness Ra of 15 nm or less is formed on at least one of the first liquid crystal layer or the liquid crystal layer for lamination or an adhesive layer for lamination having a surface roughness Ra of 15 nm or less is formed on at least one of liquid crystal layers for lamination that are laminated.

3. The method of manufacturing an optical element according to claim 1,
    wherein in the liquid crystal layer lamination step, in the step of laminating the peeled liquid crystal layer for lamination on the first liquid crystal layer or the liquid crystal layer for lamination that is separately formed,
    after allowing at least one of the first liquid crystal layer or the liquid crystal layer for lamination to enter a semi-cured state or making at least one of liquid crystal layers for lamination that are laminated to enter a semi-cured state and laminating the peeled liquid crystal layer for lamination on the first liquid crystal layer or the liquid crystal layer for lamination, the liquid crystal layer in the semi-cured state is finally cured.

4. The method of manufacturing an optical element according to claim 1,
    wherein in the first liquid crystal layer peeled off in the first liquid crystal layer peeling step, a surface roughness Ra of a surface on the first photo-alignment film side is 15 nm or less.

5. The method of manufacturing an optical element according to claim 1,
    wherein in the liquid crystal layer for lamination peeled off in the step of peeling off the liquid crystal layer for lamination in the liquid crystal layer lamination step, a surface roughness Ra of a surface on the photo-alignment film for lamination side is 15 nm or less.

6. The method of manufacturing an optical element according to claim 1,
    wherein in the first liquid crystal layer peeling step, after bonding a first temporary support including a pressure-sensitive adhesive layer to the first liquid crystal layer, the first liquid crystal layer is peeled off from the first photo-alignment film.

7. The method of manufacturing an optical element according to claim 6,
    wherein a surface roughness Ra of the pressure-sensitive adhesive layer of the first temporary support is 20 nm or less.

8. The method of manufacturing an optical element according to claim 1,
    wherein in the step of peeling off the liquid crystal layer for lamination in the liquid crystal layer lamination step, after bonding a temporary support for lamination including a pressure-sensitive adhesive layer to the liquid crystal layer for lamination, the liquid crystal layer for lamination is peeled off.

9. The method of manufacturing an optical element according to claim 8,
    wherein a surface roughness Ra of the pressure-sensitive adhesive layer of the temporary support for lamination is 20 nm or less.

10. An optical element comprising:
    a light guide plate;
    one liquid crystal layer or a plurality of liquid crystal layers that are laminated and have a liquid crystal alignment pattern in which a direction of an optical axis derived from the liquid crystal compound changes while continuously rotating in at least one in-plane direction; and
    an adhesive layer that bonds the liquid crystal layer and the light guide plate to each other,
    wherein in a case where measurement light is incident from the light guide plate side and the measurement light and the light guide plate are moved relative to each other while receiving diffracted light that is diffracted by the liquid crystal layer, an intensity variation of the diffracted light is within ±40%.

11. The method of manufacturing an optical element according to claim 2,
wherein in the first liquid crystal layer peeled off in the first liquid crystal layer peeling step, a surface roughness Ra of a surface on the first photo-alignment film side is 15 nm or less.

12. The method of manufacturing an optical element according to claim 2,
wherein in the liquid crystal layer for lamination peeled off in the step of peeling off the liquid crystal layer for lamination in the liquid crystal layer lamination step, a surface roughness Ra of a surface on the photo-alignment film for lamination side is 15 nm or less.

13. The method of manufacturing an optical element according to claim 2,
wherein in the first liquid crystal layer peeling step, after bonding a first temporary support including a pressure-sensitive adhesive layer to the first liquid crystal layer, the first liquid crystal layer is peeled off from the first photo-alignment film.

14. The method of manufacturing an optical element according to claim 13,
wherein a surface roughness Ra of the pressure-sensitive adhesive layer of the first temporary support is 20 nm or less.

15. The method of manufacturing an optical element according to claim 2,
wherein in the step of peeling off the liquid crystal layer for lamination in the liquid crystal layer lamination step, after bonding a temporary support for lamination including a pressure-sensitive adhesive layer to the liquid crystal layer for lamination, the liquid crystal layer for lamination is peeled off.

16. The method of manufacturing an optical element according to claim 15,
wherein a surface roughness Ra of the pressure-sensitive adhesive layer of the temporary support for lamination is 20 nm or less.

17. The method of manufacturing an optical element according to claim 3,
wherein in the first liquid crystal layer peeled off in the first liquid crystal layer peeling step, a surface roughness Ra of a surface on the first photo-alignment film side is 15 nm or less.

18. The method of manufacturing an optical element according to claim 3,
wherein in the liquid crystal layer for lamination peeled off in the step of peeling off the liquid crystal layer for lamination in the liquid crystal layer lamination step, a surface roughness Ra of a surface on the photo-alignment film for lamination side is 15 nm or less.

19. The method of manufacturing an optical element according to claim 3,
wherein in the first liquid crystal layer peeling step, after bonding a first temporary support including a pressure-sensitive adhesive layer to the first liquid crystal layer, the first liquid crystal layer is peeled off from the first photo-alignment film.

20. The method of manufacturing an optical element according to claim 19,
wherein a surface roughness Ra of the pressure-sensitive adhesive layer of the first temporary support is 20 nm or less.

* * * * *